United States Patent
Yamada et al.

(10) Patent No.: US 10,404,458 B1
(45) Date of Patent: Sep. 3, 2019

(54) MULTI-ROUND KEY ENCAPSULATION PROCESS

(71) Applicant: ISARA Corporation, Waterloo (CA)

(72) Inventors: Atsushi Yamada, Toronto (CA); Edward William Eaton, Waterlooo (CA)

(73) Assignee: ISARA Corporation, Waterloo, Ontario (CA)

(*) Notice: Subject to any disclaimer, the term of this patent is extended or adjusted under 35 U.S.C. 154(b) by 0 days.

(21) Appl. No.: 16/008,944

(22) Filed: Jun. 14, 2018

Related U.S. Application Data

(60) Provisional application No. 62/588,011, filed on Nov. 17, 2017.

(51) Int. Cl.
*H04L 29/06* (2006.01)
*H04L 9/30* (2006.01)
*H04L 9/06* (2006.01)
*H04L 9/08* (2006.01)

(52) U.S. Cl.
CPC ............ *H04L 9/304* (2013.01); *H04L 9/0631* (2013.01); *H04L 9/0656* (2013.01); *H04L 9/0869* (2013.01); *H04L 9/302* (2013.01); *H04L 9/3073* (2013.01); *H04L 63/0428* (2013.01)

(58) Field of Classification Search
CPC ..... H04L 9/304; H04L 9/0656; H04L 9/0869; H04L 9/0631; H04L 9/302; H04L 9/3073; H04L 63/0428
See application file for complete search history.

(56) References Cited

U.S. PATENT DOCUMENTS

| | | | |
|---|---|---|---|
| 5,515,307 A | 5/1996 | Aiello et al. | |
| 5,949,884 A | 9/1999 | Adams | |
| 7,039,192 B1 | 5/2006 | Whelan | |
| 7,277,548 B2 * | 10/2007 | Park | H04L 63/0457 380/270 |
| 8,958,553 B2 | 2/2015 | Tomlinson et al. | |
| 9,407,437 B1 | 8/2016 | Campagna | |
| 9,614,668 B1 | 4/2017 | Simmons et al. | |

(Continued)

FOREIGN PATENT DOCUMENTS

WO    2015/056236    4/2015

OTHER PUBLICATIONS

USPTO, Non-final Office Action issued in U.S. Appl. No. 15/619,046 dated Aug. 29, 2017, 28 pages.

(Continued)

*Primary Examiner* — Kendall Dolly
(74) *Attorney, Agent, or Firm* — Henry Patent Law Firm PLLC

(57) ABSTRACT

In a general aspect, a random seed value is used in a key encapsulation process to generate multiple ciphertexts for a recipient. The key encapsulation process includes multiple encapsulation rounds and each encapsulation round generates a respective ciphertext based on the random seed value and an additional value. The additional value includes an index indicating the encapsulation round. A symmetric key is generated based on the random seed value, and an encrypted message is generated based on the symmetric key. The ciphertexts and the encrypted message are provided for the recipient for transmission between nodes in a communication system.

21 Claims, 12 Drawing Sheets

(56) References Cited

U.S. PATENT DOCUMENTS

| | | | |
|---|---|---|---|
| 9,912,479 | B1 | 3/2018 | Yamada |
| 10,061,636 | B1 | 8/2018 | Eaton et al. |
| 2003/0081770 | A1 | 5/2003 | Futa et al. |
| 2003/0165238 | A1 | 9/2003 | Naccache et al. |
| 2004/0221163 | A1* | 11/2004 | Jorgensen ............ H04L 63/0428 713/182 |
| 2007/0081668 | A1 | 4/2007 | McGrew et al. |
| 2010/0281336 | A1* | 11/2010 | Seurin ...................... H04L 9/06 714/755 |
| 2011/0096923 | A1 | 4/2011 | Rollgen |
| 2011/0211691 | A1 | 9/2011 | Minematsu |
| 2012/0300925 | A1 | 11/2012 | Zaverucha et al. |
| 2013/0073850 | A1* | 3/2013 | Zaverucha ............ H04L 9/0869 713/168 |
| 2013/0287207 | A1 | 10/2013 | Zaverucha et al. |
| 2013/0290713 | A1 | 10/2013 | Zaverucha et al. |
| 2014/0019771 | A1 | 1/2014 | Emmett et al. |
| 2014/0105403 | A1 | 4/2014 | Baldi et al. |
| 2014/0355754 | A1 | 12/2014 | Leung et al. |
| 2015/0163060 | A1* | 6/2015 | Tomlinson .............. H04L 9/304 380/30 |
| 2016/0050067 | A1* | 2/2016 | Merchan ............... H04L 9/0838 713/171 |
| 2016/0080142 | A1 | 3/2016 | Isshiki et al. |
| 2016/0105277 | A1 | 4/2016 | Isshiki et al. |
| 2016/0112189 | A1 | 4/2016 | Tomaru |
| 2016/0330023 | A1 | 11/2016 | Tanamoto et al. |
| 2017/0048058 | A1 | 2/2017 | Ren et al. |
| 2017/0104590 | A1 | 4/2017 | Wang |
| 2017/0244564 | A1 | 8/2017 | Naslund et al. |
| 2017/0310475 | A1* | 10/2017 | Hu ......................... H04W 12/04 |
| 2017/0324554 | A1 | 11/2017 | Tomlinson et al. |

OTHER PUBLICATIONS

USPTO, Notice of Allowance dated May 10, 2018, in U.S. Appl. No. 15/852,816, 33 pgs.

USPTO, Notice of Allowance dated May 3, 2018, in U.S. Appl. No. 15/852,892, 34 pgs.

USPTO, Notice of Allowance dated Dec. 18, 2017, in U.S. Appl. No. 15/619,046, 8 pgs.

"RSA Laboratories, PKCS #1 v2.2: RSA Cryptography Standard, 2012, 63 pages".

"Wikipedia, Niederreiter Cryptosystem, 2016, 3 pages".

Alkim, Erdem, et al., "Post-quantum key exchange—a new hope", Cryptology ePrint Archive: Report 2015/1092, Dec. 7, 2015, 34 pages.

Alkim, Erdem, et al., "Post-quantum key exchange—a new hope", Cryptology ePrint Archive: Report 2015/1092, Mar. 29, 2016, 21 pages.

Baldi, Marco, et al., "Quasi-Cyclic Low-Density Parity-Check Codes in the McEliece Cryptosystem", IEEE 2007; pp. 951-956, 6 pages.

Barreto, et al., CAKE: Code-based Algorithm for Key Encapsulation, Aug. 2017, 21 pgs.

Bernstein, Daniel, et al., "McBits: fast constant-time code-based cryptography", Jun. 21, 2015, 27 pages.

Bernstein, Daniel, et al., "NTRU Prime", May 11, 2016, 34 pages.

Bernstein, Daniel, et al., "Post-Quantum Cryptography", Springer; ISBN: 978-3-540-88701-0, 2009, 248 pages.

Cramer, Design and Analysis of Practical Public-Key Encryption Schemes Secure against Adaptive Chosen Ciphertext Attack, Shoup, 2003,, Aug. 14, 2003, 69 pgs.

Dent, Alexander, "A Designer's Guide to KEMs", Cryptology ePrint Archive: Report 2002/174, Oct. 31, 2005, 28 pages.

Dottling, et al., "A CCA2 Secure Variant of the McEliece Cryptosystem", Oct. 2012, 9 pgs.

Fujisaki, et al., "Secure Integration of Asymmetric and Symmetric Encyption Schemes", 1999, 18 pgs.

Galbraith, Steven, "On the Security of Supersingular Isogeny Cryptosystems", Cryptology ePrint Archive: Report 2016/859, Jan. 31, 2017, 21 pages.

Guo, Qian, "A Key Recovery Attack on MDPC with CCA Security Using Decoding Errors", Cryptology ePrint Archive: Report 2016/858, Sep. 8, 2016, 29 pages.

Howgrave-Graham, Nick, et al., "The Impact of Decryption Failures on the Security of NTRU Encryption", Advances in Cryptology—CRYPTO 2003, Aug. 2003, 28 pgs.

Jonsson, et al., "RFC 3447, Network Working Group, Public-Key Cryptography Standards (PKCS) #1: RSA Cryptography Specifications Version 2.1", 2003, 68 pgs.

Kobara, et al., "Semantically Secure McEliece Public-Key Cryptosystems: Conversions for McEliece PKC", 2001, 17 pgs.

Loidreau, Pierre, "Strengthening McEliece Cryptosystem", Okamoto T. (eds) Advances in Cryptology—ASIACRYPT 2000; Lecture Notes in Computer Science, vol. 1976; Springer, Berlin, Heidelberg, 2000, 14 pgs.

McEliece, "A Public-Key Cryptosystem Based on Algebraic Coding Theory, DSN Progress Report", 1978, 3 pgs.

Misoczki, Rafael, et al., "MDPC-McEliece: New McEliece Variants from Moderate Density Parity-Check Codes"Cryptology ePrint Archive: Report 2012/409, May 30, 2013, 22 pages.

Overbeck, Raphael, et al., "Code-based cryptography", Post-Quantum Cryptography; Springer, Berlin, Heidelberg, 2009, 51 pgs.

Pointcheval, "Chosen-Ciphertext Security for any One-Way Cryptosystem", 2000, 17 pgs.

Repka, Marek, et al., "Overview of the McEliece Cryptosystem and its Security", Tatra Mt. Math Publ 60, pp. 57-83, 2014, 27 pages.

Rostaghi, Roohallah, "An Efficient CCA2-Secure Variant of the McEliece Cryptosystem in the Standard Model", arXiv:1302.0347v4 [cs CR], Sep. 7, 2013, 17 pgs.

USPTO, "Notice of Allowance", issued in U.S. Appl. No. 15/265,355 dated Feb. 2, 2017, 33 pages.

Wang, Yongge, Revised Quantum Resistant Public Key Encryption Scheme RLCE and IND-CCA2 Security for McEliece Schemes, Apr. 6, 2017, 20 pgs.

Wikipedia, "Fisher-Yates shuffle", accessed at https://en.wikipedia.org/wiki/Fisher%E2%80%93Yates_shuffle on May 12, 2017, 2017, 9 pages.

Wikipedia, "S/MIME", accessed at https://en.wikipedia.org/wiki/S/MIME on May 12, 2017, 2017, 3 pages.

USPTO, Non-Final Office Action dated Feb. 1, 2019, in U.S. Appl. No. 16/008,916, 24 pgs.

* cited by examiner

MULTI-ROUND KEY ENCAPSULATION PROCESS

CROSS-REFERENCE TO RELATED APPLICATIONS

This application claims priority to U.S. Provisional Application No. 62/588,011 entitled "Multi-Use Key Encapsulation Process" and filed Nov. 17, 2017, which is hereby incorporated by reference.

BACKGROUND

The following description relates to key encapsulation mechanisms for public key cryptosystems.

Cryptography systems ("cryptosystems") are used to communicate securely over public channels. For example, cryptosystems may provide confidentiality by encrypting messages sent over the public channels. Public key encryption algorithms may utilize public and private cryptographic keys to encrypt and decrypt messages. Some public key cryptosystems may be vulnerable to attacks by an adversary, such as an adversary with access to quantum computational resources.

DETAILED DESCRIPTION

Figure 1:
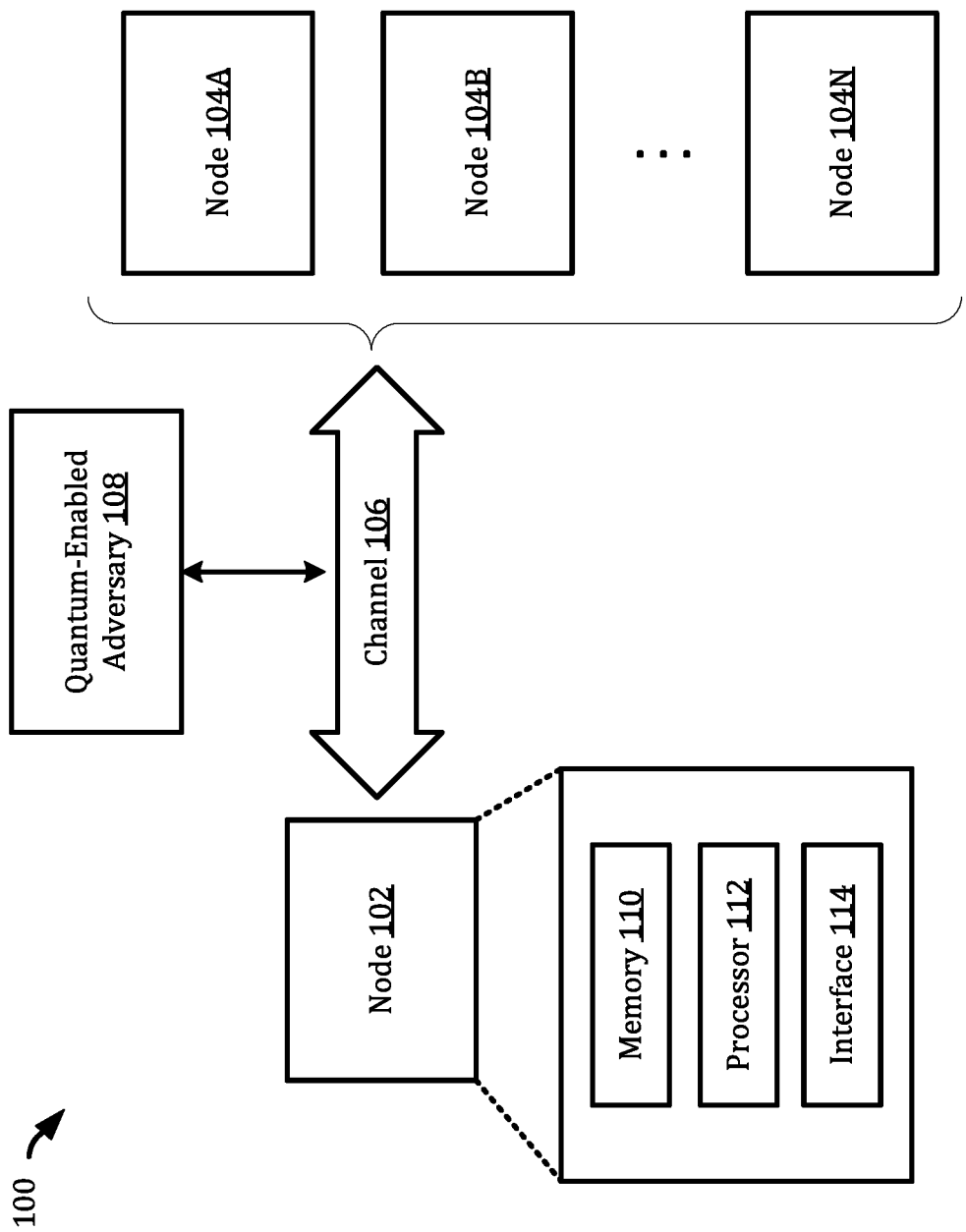
FIG. 1 is a block diagram showing aspects of an example communication system.

In aspects of what is described here, a multi-use key encapsulation process is used with a public key cryptosystem. For instance, in some examples, a multi-use key encapsulation process may use the same random seed value in multiple executions, deriving different error vectors and plaintext values for each execution (e.g., multiple rounds of encapsulation for a recipient, encapsulation for multiple recipients, or a combination of both). In some instances, this can be done by including one or more additional inputs to the error vector derivation function v(•) along with the random seed value s. The additional inputs may include an identifier i of a recipient (e.g., for use in multi-recipient communications), an index d associated with a round of encapsulation (e.g., for use in multi-ciphertext encapsulation processes), another type of information, or a combination thereof.

In some implementations, a single-round key encapsulation process uses the same random seed value for each of multiple recipients. For example, a random seed value s can be provided as input to an error vector derivation function of an encapsulation process along with an identifier i of a particular recipient (v(s,i), e.g., v(s||i)) to produce a unique error vector for each recipient of an encrypted message. The error vectors can then be used to generate a unique ciphertext for each recipient. The identifier i can be, in some cases, a unique string associated with the recipient (e.g., an e-mail address) or a public key for the recipient. The encapsulation process also produces a symmetric key that is used to encrypt the message. Each recipient, using their unique identifier i, can then run a decapsulation process to recover the symmetric key used by the sender to encrypt the message.

In some implementations, a multi-round key encapsulation process (multiple rounds of encapsulation for one recipient) uses the same random seed value for each round of ciphertext generation. For example, a random seed value s can be provided as input to an error vector derivation function of an encapsulation process along with an index d of the particular round of encapsulation (v (s,d), e.g., v(s||d)) to produce a unique error vector for each round. The error vectors can then be used to generate multiple ciphertexts that are sent to a recipient along with an encrypted message. The encapsulation process also produces a symmetric key that is used to encrypt the message. Each recipient can then run a decapsulation process to recover the symmetric key used by the sender to encrypt the message. The decapsulation process may decrypt one ciphertext at a time to recover the symmetric key. If a failure occurs in the decryption of a first ciphertext, then a second ciphertext is decrypted to recover the symmetric key.

In some implementations, a multi-round key encapsulation process as described above is used in a multi-recipient scenario, with the same random seed value being used for each round and for each recipient. For example, a random seed value s can be provided as input to an error vector derivation function of an encapsulation process along with an index d of the particular round of encapsulation and an identifier i of a particular recipient (v(s,i,d), e.g., v(s||i||d)) to produce unique error vectors for each round and each recipient. Each recipient can then run a decapsulation process to recover the symmetric key used by the sender to encrypt the message. The decapsulation process may decrypt one ciphertext at a time to recover the symmetric key. If a failure occurs in the decryption of a first ciphertext, then a second ciphertext is decrypted to recover the symmetric key.

In some implementations, the decapsulation process includes the use of a confirmation value generated during the corresponding encapsulation process. For example, a confirmation check value may be generated during the decapsulation process, and if the confirmation check value is the same as a confirmation value sent by the sender (e.g., with a ciphertext), the decapsulation process can output a computed symmetric key, which can be used to decrypt a message. However, if the confirmation check value is not the same as a confirmation value sent by the sender, then a failure may be returned.

In some implementations, the decapsulation process computes the random seed value s' based on the ciphertext provided by the sender, and then uses the computed seed value (in the encapsulation process) to generate a ciphertext check value. If the ciphertext check value is the same as a ciphertext sent by the sender, the decapsulation process can output a computed symmetric key, which can be used to decrypt a message. However, if the ciphertext check value is not the same as the ciphertext sent by the sender, then a failure may be returned.

Aspects of the present disclosure may provide one or more advantages in some instances. For example, some aspects may provide communications (e.g., electronic mail communications formatted according to the Secure/Multipurpose Internet Mail Extensions (S/MIME) standard) over a public channel that are secure against adversaries equipped with classical or quantum computational resources. The communications may be secured, in some aspects, using a one pass protocol using a static key pair. In some instances, the public key used to secure the communications may be small compared to other public key cryptosystem implementations (e.g., the McEliece cryptosystem implemented using a Goppa code). For instance, in some implementations, the public key may be approximately 4 kilobytes (kB) whereas the public key in a McBits implementation may be approximately 1 Megabytes (MB). In addition, in some aspects, a key pair for the public key cryptosystem may be used repeatedly without jeopardizing security. Some aspects may provide secure communications that are resistant to key recovery attacks, the Adaptive Chosen Ciphertext Attack (CCA2), or both. Some aspects may conserve bandwidth by not utilizing a confirmation value in a decapsulation process (e.g., by not computing or not sending the confirmation value to each recipient).

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more secure, more efficient or providing other advantages in some instances.

Certain aspects may also allow the same random seed value to be used for each execution of an encapsulation process, allowing for the same symmetric key to be used for each recipient. If an additional input to an error vector derivation function of an encapsulation process is not used, the same random seed value cannot be used for multiple recipients without jeopardizing security, since the plaintext value used to generate a ciphertext may be easily obtained. For example, where ciphertexts for two recipients are computed as:

$$C_1^a = xG^a + e$$

$$C_1^b = xG^b + e$$

the plaintext value x can be easily recovered from $G^a$, $G^b$, $C_1^a$, and $C_1^b$ by $$C_1^a - C_1^b = x(G^a - G^b).$$

Once the plaintext value x is obtained, the error vector e and then the random seed value s may be derived easily, allowing an attacker to decrypt communications. In contrast, where an additional input is used with the error vector derivation function, different error vectors are obtained for each recipient and the plaintext value is not easily derivable. For example, where ciphertexts are computed for each recipient as:

$$C_{1a} = x_a G_a + e_a$$

$$C_{1b} = x_b G_b + e_b$$

the same attack to recover the plaintext values x will not work because $e_a \neq e_b$ and $x_a \neq x_b$.

In some aspects, decryption failures in a decapsulation process (e.g., caused by probabilistic decoding issues in the decryption) may be mitigated. For instance, by performing multiple rounds of encapsulation, multiple ciphertexts may be sent to each recipient. Thus, in the event of a decryption failure for one ciphertext, another may be decrypted instead and used to derive a symmetric key. By decreasing the rate of decryption failures in this manner, attacks that take advantage of decryption failures can be mitigated as well.

FIG. 1 is a block diagram showing aspects of an example communication system 100. The example communication system 100 shown in FIG. 1 includes nodes 102, 104. In the example shown, the node 102 implements a key encapsulation process and sends an encrypted message to each of the nodes 104 over the channel 106. In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, IoT devices, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

In the example shown in FIG. 1, the entities represented by the nodes 102, 104 may correspond to a computing device, a computer system, an IP address or other network address, or another type of computer-readable identifier or instance of a computer resource. Accordingly, the computations and other operations of each entity may be performed by one or more processors or other elements of the respective node 102, 104. Similarly, information sent to or received by an entity may be sent to or received by an element (e.g., one or more processors, memories, or interfaces) of the respective node 102, 104.

The example memory 110 can include, for example, random access memory (RAM), a storage device (e.g., a writable read-only memory (ROM) or others), a hard disk, or other types of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations or processes shown in any of FIGS. 2-6.

Instructions (e.g., computer code, a computer program, etc.) associated with an operating system, computer applications, or other resources may be stored in the memory 110. In addition, the memory 110 can also store application data and data objects that can be interpreted by one or more applications or virtual machines running on the node 102. The node 102 can be preprogrammed, or it can be programmed (and reprogrammed), by loading a program from another source (e.g., from a removable memory device, from a remote server, from a data network, or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations and process shown in FIGS. 2-6, as described further below.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations and processes shown in FIGS. 2-6, as described further below.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using various wireless protocols or standards. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptosystems are known to be insecure against an attacker armed with a scalable quantum computer. The threat of quantum computers to public key cryptography can be mitigated by switching to other public key cryptosystems that are believed to be invulnerable to quantum attack. For example, certain code-based encryption schemes (e.g., the McEliece and Niederreiter cryptosystems) have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key from public information to obtain a shared secret key).

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptosystems. For example, the quantum-enabled adversary 108 may be capable of computing prime factors fast enough to compromise certain RSA-based cryptosystems or computing discrete logarithms fast enough to compromise certain ECC-based cryptosystems.

In the example shown in FIG. 1, the nodes 102, 104 may use a quantum-resistant cryptosystem that cannot be compromised by the example quantum-enabled adversary 108. For instance, the nodes 102, 104 may communicate using a cryptosystem that is secure against a quantum computer that can efficiently execute Shor's algorithm or other types of algorithms that are known to compromise the security of certain conventional cryptography standards. In some implementations, for example, the nodes 102, 104 communicate using a McEliece cryptosystem implemented using a Quasi-Cyclic Medium Density Parity Check (QC-MDPC) code, a Niederreiter cryptosystem, or another type of public key cryptosystem. The nodes 102, 104 may implement a key encapsulation process to provide additional security against certain known attacks by adversaries. For example, in some implementations, a key encapsulation mechanism (KEM) can be used with the McEliece cryptosystem implemented using a QC-MDPC code to provide security against key recovery attacks and the Adaptive Chosen Ciphertext Attack (CCA2). The encapsulating node may use the same random seed value for each execution of the key encapsulation process (e.g., for each unique recipient, each round of encapsulation, or both). In some implementations, the nodes 102, 104 execute secure communication over the channel 106 using the example techniques provided in one or more of FIGS. 2A, 2B, 2C, 2D, 3A, 3B, 3C, 3D, 4 5, and 6 or using other techniques.

Figure 2A:
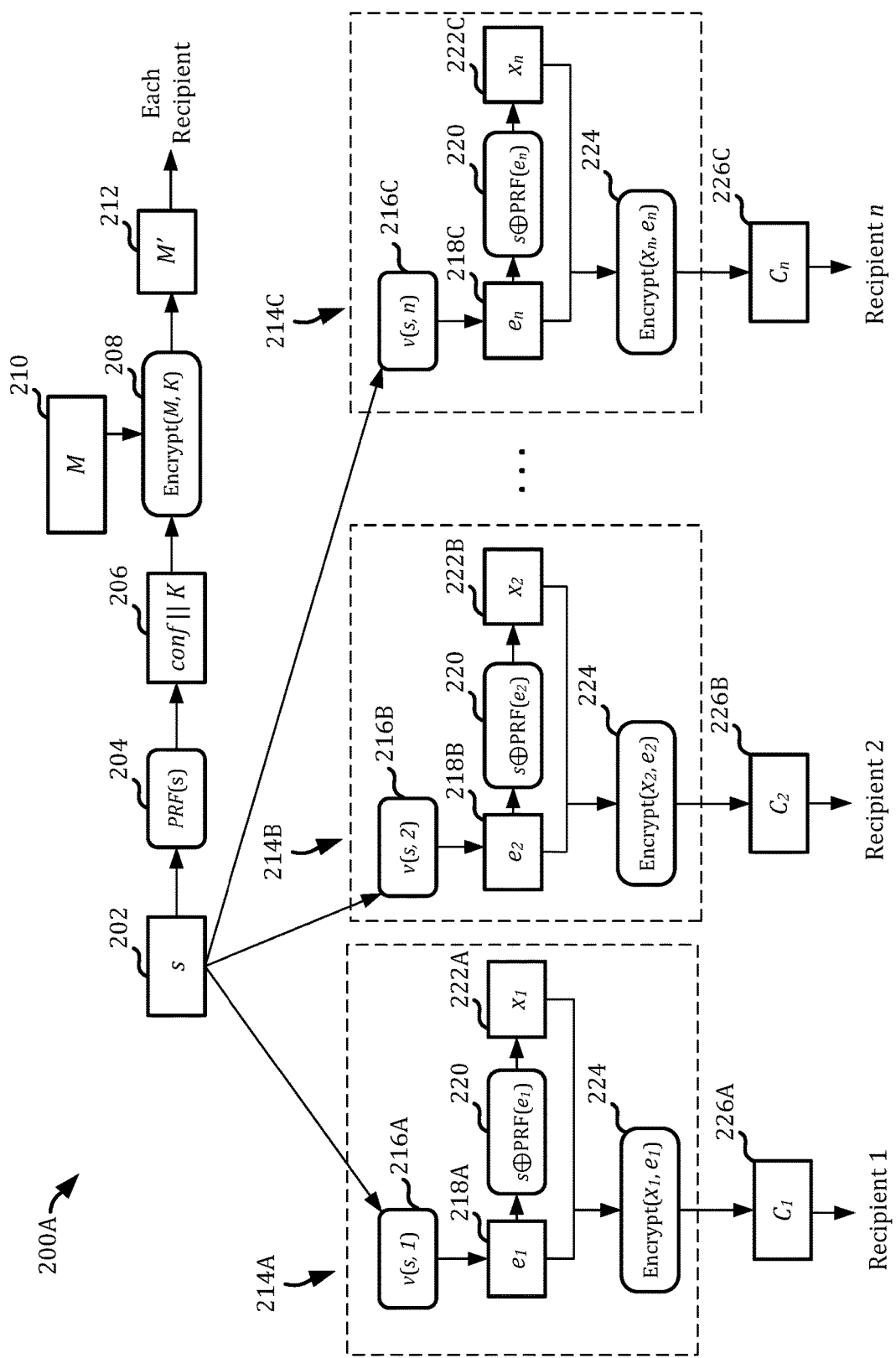
FIG. 2A is a diagram showing an example key encapsulation process.

FIG. 2A is a diagram showing an example single-round key encapsulation process 200A. The example process 200A may be performed by a node of a communication system that is sending an encrypted message, a ciphertext, or other information to a recipient. The node may be implemented similar to the nodes 102, 104 of FIG. 1. For instance, the node may have computational resources (e.g., hardware, software, firmware) that are used to communicate with other nodes in the communication system, and may include a memory, processor, and interface as described above with respect to node 102 of FIG. 1. The node can be implemented in various systems, such as, for example, laptops, desktops, workstations, smartphones, tablets, personal digital assistants, servers, server clusters, mainframes, and other types of computer systems.

In the example shown, a random seed value 202 (s) is obtained. The random seed value 202 may be generated using a random number generator or in another manner. In some implementations, the random seed value 202 is a k-bit value. A pseudorandom function 204 is applied to the random value 202 to produce a string 206 that includes a confirmation value conf and a symmetric key K. For instance, in the example shown, the string 206 is a concatenation of the confirmation value conf and the symmetric key K. In some implementations, the symmetric key K includes a specified number of the least significant bits of the string 206, and the confirmation value includes the remaining bits of the string 206. The pseudorandom function 204 may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function). The symmetric key K is then used in an encryption function 208 to produce an encrypted message 212 from an unencrypted a message 210. In some implementations, the encryption function 208 is implemented according to symmetric cipher system, such as, for example, an Advanced Encryption Standard (AES) cryptosystem. In some implementations, the message 210 that is encrypted by the encryption function 208 is an electronic mail message (e.g., a message formatted according to the Secure/Multipurpose Internet Mail Extensions (S/MIME) standard). The message 210 may be formatted in another manner. The encrypted message 212 may then be sent to each intended recipient. In some implementations, the confirmation value conf is also sent to each of the n recipients (e.g., along with the encrypted message 212).

In addition to generating the encrypted message 212, the process 200A applies an encapsulation process 214 for each recipient to generate a unique ciphertext for transmission to the recipient. An encapsulation process other than the one shown may be used, in some instances. In the example shown, the encapsulation process 214 applies an error vector derivation function 216 (v(•)) to the random seed value 202 and a unique identifier i (e.g., an email address or public key of the recipient) associated with the recipient to produce an error vector 218 (e). In some implementations, the input to the error vector derivation function 216 is a combination (e.g., a concatenation) of the random seed value 202 and the identifier i (e.g., v(s∥i)). In some implementations, the error vector derivation function 216 is a one-way (non-invertible) function that generates an n-bit error vector 218 (an n-dimensional vector of bits) in a pseudorandom manner. For example, the error vector derivation function 216 may apply a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the random seed value 202 and identifier i, and apply a filter (e.g., a Fisher-Yates shuffle) to the pseudorandom function output to produce a set of t integers $(a_1, a_2, \ldots, a_n)$, where each integer is in the range $1 \leq a_i \leq n$ for $a_i \neq a_j$ for $i \neq j$. The set of t integers can then be used to generate the error vector 218. For example, the error vector 218 may have a Hamming weight equal to t, where the $a_i$-th element of the error vector is set to one (1) and the other elements are set to zero (0).

The example encapsulation process 214 then obtains a plaintext value 222 (x) based on the random seed value 202 and the error vector 218. In the example shown, the plaintext value 218 is obtained by applying an exclusive-OR (XOR) function to the random seed value 202 and the output of a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) applied to the error vector 218. The plaintext value 222 and the error vector 218 are then used in an encryption function 224 to produce a ciphertext 226 ($C_i$). In some implementations, the encryption function 224 is a McEliece encryption function implemented according to a McEliece cryptosystem using the QC-MDPC code. For instance, the QC-MDPC code may generate a public key G and private key H, where G is a k×n code generator matrix and H is a (n−k)×n parity check matrix for G. In some implementations, the private key matrix H may be computed first (e.g., by the recipient), and the public key matrix G may be derived from H. The encryption function 224 may use the public key matrix G to generate the ciphertext 226, for example, according to the equation $C_i = x_i G + e_i$, where $C_i$ is the ciphertext 226, $x_i$ is the plaintext value 222, G is the public key matrix for the McEliece cryptosystem, and $e_i$ is the error vector 218.

Figure 2B:
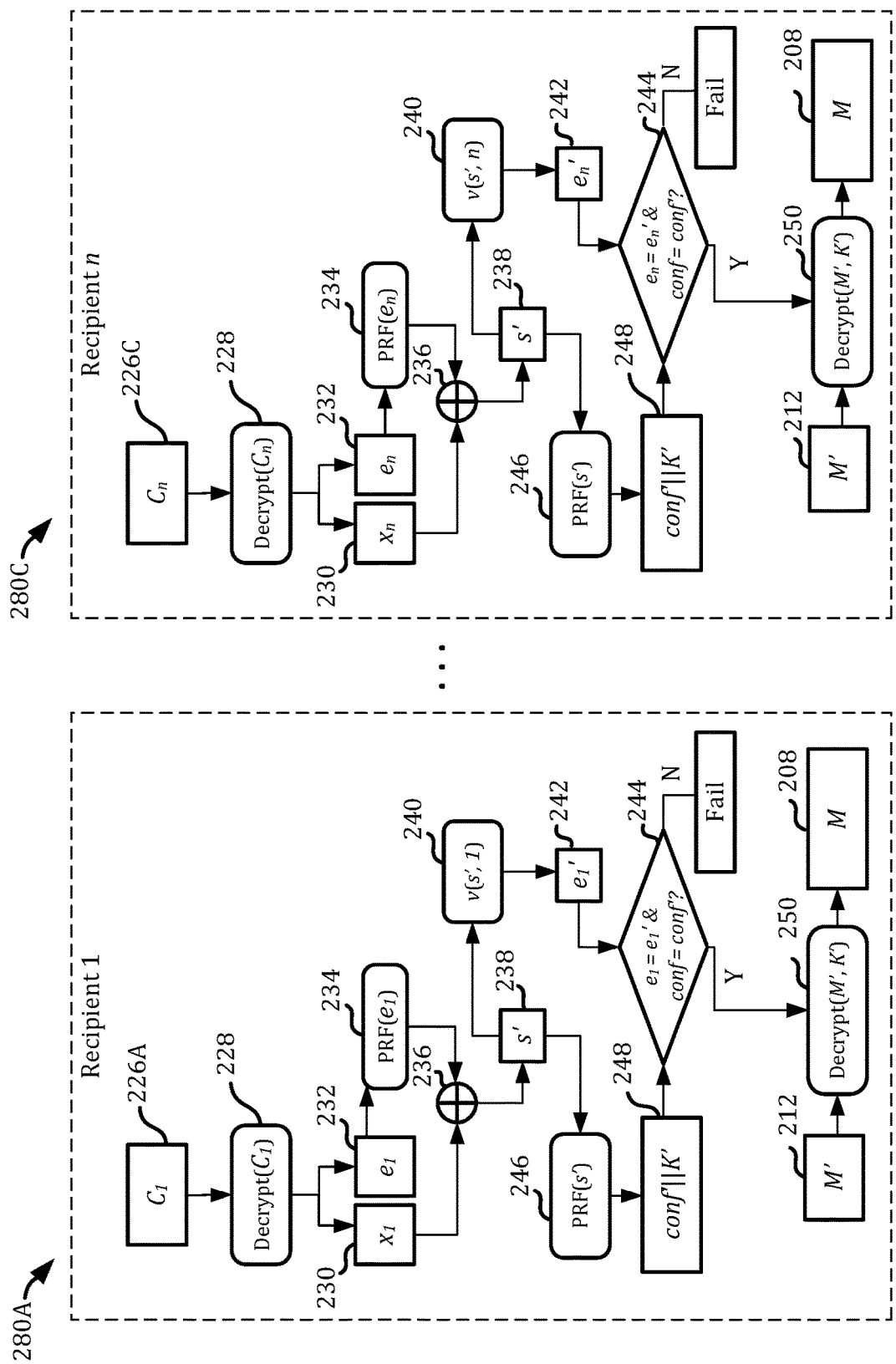
FIG. 2B is a diagram showing an example key decapsulation process corresponding to the key encapsulation process of FIG. 2A.

The ciphertexts $C_i$ are then transmitted to the respective recipients (e.g., along with the encrypted message 212). The recipient may then use its respective ciphertext $C_i$ in a decapsulation process to compute the symmetric key K, which is then used to decrypt the encrypted message 212. FIGS. 2B, 2D show example decapsulation processes 280, 290, respectively.

FIG. 2B is a diagram showing an example key decapsulation process 280 corresponding to the key encapsulation process 200A of FIG. 2A. In the example shown, the decapsulation process 280 is performed by each recipient node, which may be implemented similar to the nodes 102, 104 of FIG. 1. For instance, the node may have computational resources (e.g., hardware, software, firmware) that are used to communicate with other nodes in the communication system, and may include a memory, processor, and interface as described above with respect to node 102 of FIG. 1. The node can be implemented in various systems, such as, for example, laptops, desktops, workstations, smartphones, tablets, personal digital assistants, servers, server clusters, mainframes, and other types of computer systems.

In the example shown, each recipient applies a decryption function 228 to its respective ciphertext 226 to produce a first decryption function output 230 ($x_i$) and a second decryption function output 232 ($e_i$). A reconstructed seed value 238 (s') is then generated from the decryption function outputs 230, 232. In the example shown, this is done by applying a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the second decryption function output 232, and then applying an exclusive-OR (XOR) function 236 to the first decryption function output 230 and the output of the pseudorandom function 234. The decryption function 228 may be the inverse of the encryption function 224. In some implementations, the decryption function 228 is a McEliece decryption function implemented according to a McEliece cryptosystem using the QC-MDPC code. For instance, the private key matrix H discussed above may be used to decrypt the ciphertext 226, for example, by applying a QC-MDPC decoding algorithm equipped with knowledge of H. In the example shown, the reconstructed seed values 238 generated by each recipient match, even though different decryption function outputs are obtained.

An error vector derivation function 240 is then applied to the reconstructed seed value 238 to produce an error vector check value 242 ($e_i'$), and a pseudorandom function 246 (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) is applied to the reconstructed seed value 238 to produce a string 248 that includes a confirmation check value cont and a symmetric key K'. In the example shown, for instance, the string 248 includes a concatenation of the confirmation check value conf and the symmetric key K'.

The error vector check value 242 is then compared to the second decryption function output 232, and the confirmation check value is compared to a confirmation received from the sender of the encrypted message 212 (e.g., in the same or different transmission). If both values match (conf=conf' and $e_i = e_i'$), then the symmetric key K' is provided to a decryption function 250. The decryption function 250 uses the symmetric key K' to decrypt the encrypted message 212 received by the recipient, and produces the unencrypted message 208. The decryption function 250 may be the inverse of the encryption function 208. For instance, in some implementations, the decryption function 250 is implemented according to symmetric cipher system, such as, for example, an Advanced Encryption Standard (AES) cryptosystem.

If both values do not match (conf≠conf' or $e_i \neq e_i'$), then a failure is returned. In some implementations, returning a failure includes delivering an error message, a return code, a flag, or another type of indicator. The indicator may be sent back to the sender of the message in some instances. For example, in some implementations, a failure indicator may be sent back to the sender of the message. In some implementations, however, no indicator is sent to the sender of the message and the indicator is kept only with the recipient.

Figure 2C:
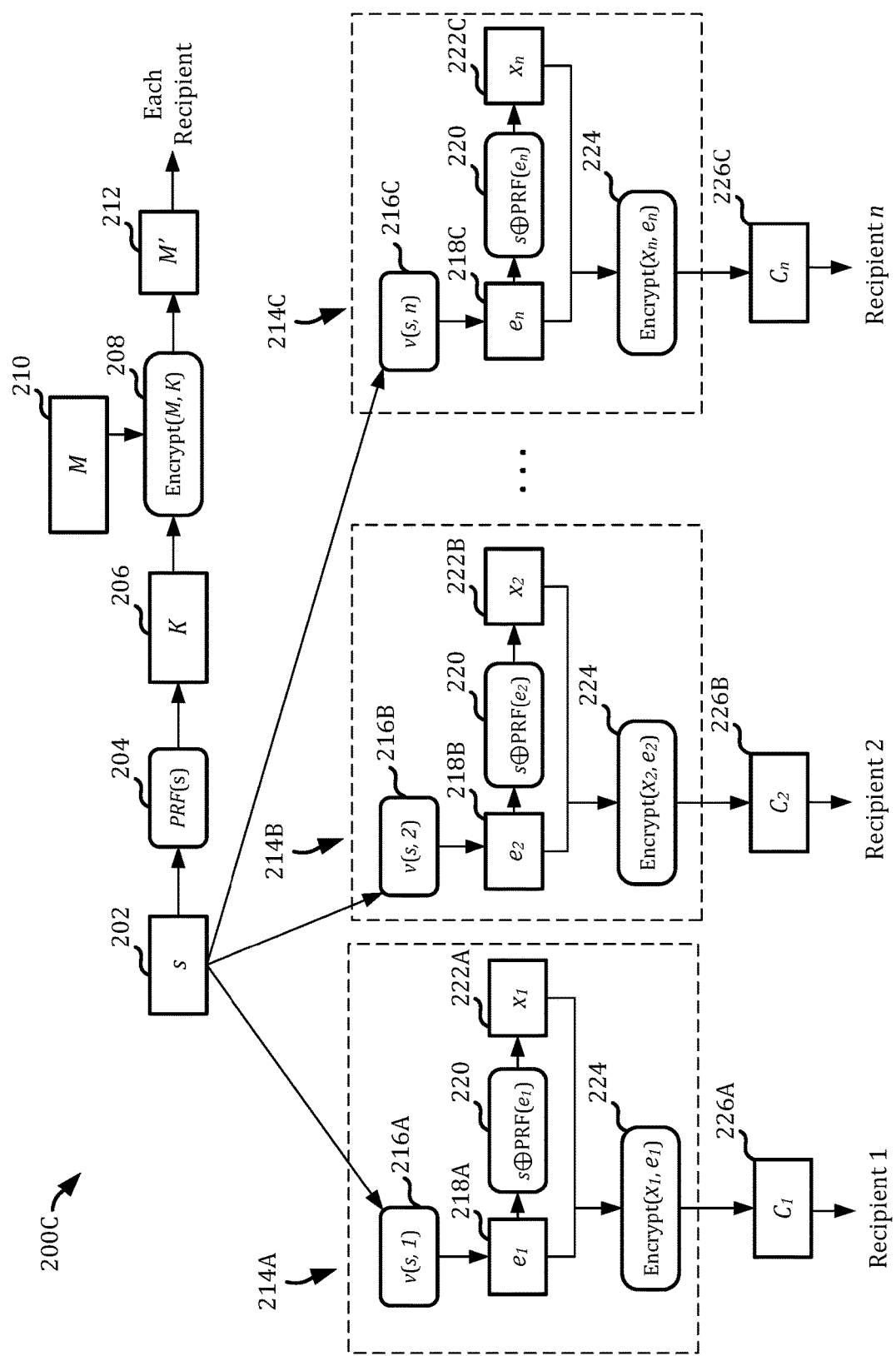
FIG. 2C is a diagram showing another example key encapsulation process.
Figure 2D:
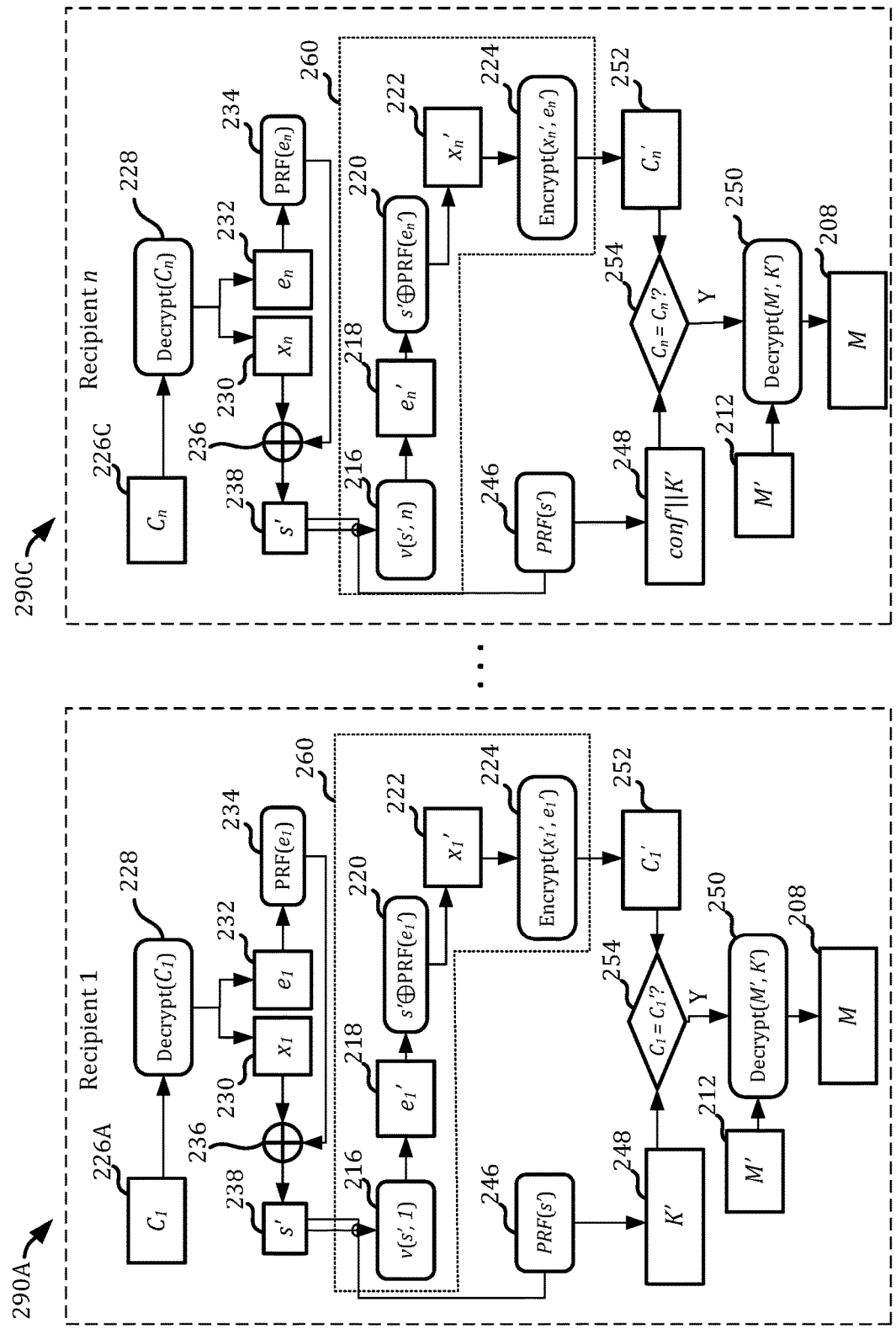
FIG. 2D is a diagram showing an example key decapsulation process corresponding to the key encapsulation process of FIG. 2C.

FIG. 2C is a diagram showing an example single-round key encapsulation process 200C. The example process 200C is the same as process 200A of FIG. 2A, but without the generation of a confirmation value. That is, all operations in the example shown in FIG. 2C are the same as the example process 200A of FIG. 2A, except that the pseudorandom function 204 produces an output that includes a symmetric key K without a confirmation value conf.

FIG. 2D is a diagram showing an example key decapsulation process 290 corresponding to the key encapsulation process 200C of FIG. 2C. In the example shown, the decapsulation process 290 is performed by each recipient node, which may be implemented similar to the nodes 102, 104 of FIG. 1. For instance, the node may have computational resources (e.g., hardware, software, firmware) that are used to communicate with other nodes in the communication system, and may include a memory, processor, and interface as described above with respect to node 102 of FIG. 1. The node can be implemented in various systems, such as, for example, laptops, desktops, workstations, smartphones, tablets, personal digital assistants, servers, server clusters, mainframes, and other types of computer systems.

The example decapsulation process 290 performs the same operations as the decapsulation process 280 to obtain a reconstructed seed value 238 (s'J. However, the decapsulation process 290 uses the reconstructed seed value 238 in the encapsulation process 260 to obtain a ciphertext check value 252. The encapsulation process 260 may be the same as the encapsulation process 214 performed by the sender (e.g., as shown in FIG. 2A). In addition, like the encapsulation process 280, a pseudorandom function 246 (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) is applied to the reconstructed seed value 238 to produce a string 248 that includes a symmetric key K'.

The ciphertext check value 252 is then compared to the ciphertext 226. If the values match ($C_i=C_i'$), then the symmetric key K' is provided to a decryption function 250. The decryption function 250 uses the symmetric key K' to decrypt the encrypted message 212 received by the recipient, and produces the unencrypted message 208. The decryption function 250 may be the inverse of the encryption function 208. For instance, in some implementations, the decryption function 250 is implemented according to symmetric cipher system, such as, for example, an Advanced Encryption Standard (AES) cryptosystem.

If the values do not match ($C_i \neq C_i'$), then a failure is returned. In some implementations, returning a failure includes delivering an error message, a return code, a flag, or another type of indicator. The indicator may be sent back to the sender of the message in some instances. For example, in some implementations, a failure indicator may be sent back to the sender of the message. In some implementations, however, no indicator is sent to the sender of the message and the indicator is kept only with the recipient.

Figure 3A:
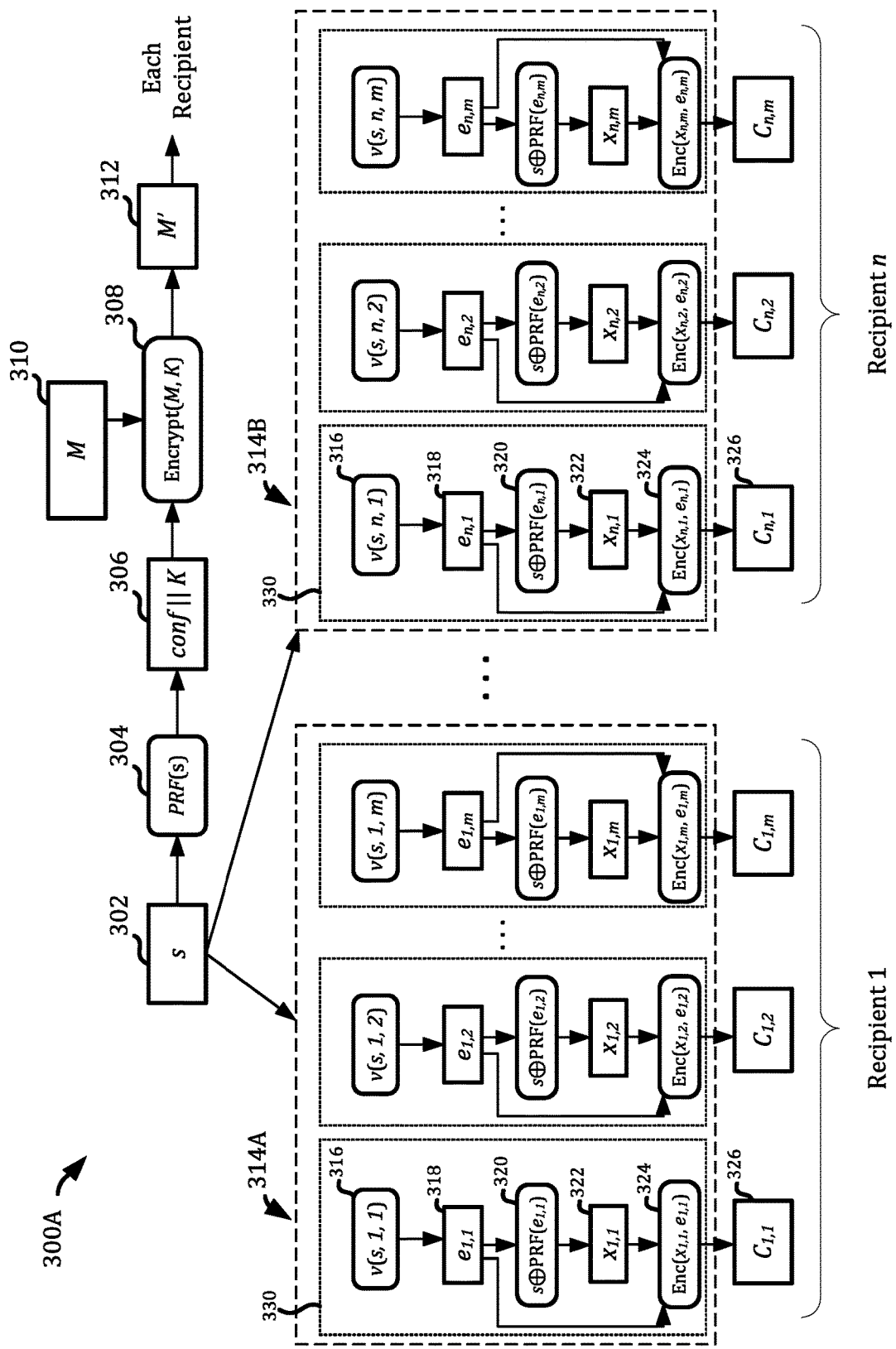
FIG. 3A is a diagram showing an example key encapsulation process.

FIG. 3A is a diagram showing an example multi-round key encapsulation process 300A. The example process 300A may be performed by a node of a communication system that is sending an encrypted message, a ciphertext, or other information to a recipient. The node may be implemented similar to the nodes 102, 104 of FIG. 1. For instance, the node may have computational resources (e.g., hardware, software, firmware) that are used to communicate with other nodes in the communication system, and may include a memory, processor, and interface as described above with respect to node 102 of FIG. 1. The node can be implemented in various systems, such as, for example, laptops, desktops, workstations, smartphones, tablets, personal digital assistants, servers, server clusters, mainframes, and other types of computer systems.

In the example shown, a random seed value 302 (s) is obtained. The random seed value 302 may be generated using a random number generator or in another manner. In some implementations, the random seed value 302 is a k-bit value. A pseudorandom function 304 is applied to the random value 302 to produce a string 306 that includes a confirmation value conf and a symmetric key K. For instance, in the example shown, the string 306 is a concatenation of the confirmation value conf and the symmetric key K. In some implementations, the symmetric key K includes a specified number of the least significant bits of the string 306, and the confirmation value includes the remaining bits of the string 306. The pseudorandom function 304 may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function). The symmetric key K is then used in an encryption function 308 to produce an encrypted message 312 from an unencrypted a message 310. In some implementations, the encryption function 308 is implemented according to symmetric cipher system, such as, for example, an Advanced Encryption Standard (AES) cryptosystem. In some implementations, the message 310 that is encrypted by the encryption function 308 is an electronic mail message (e.g., a message formatted according to the Secure/Multipurpose Internet Mail Extensions (S/MIME) standard). The message 310 may be formatted in another manner. The encrypted message 312 may then be sent to each intended recipient. In some implementations, the confirmation value conf is also sent to each the n recipients (e.g., along with the encrypted message 312).

In addition to generating the encrypted message 312, the process 300A applies an encapsulation process 314 for each recipient to generate multiple ciphertexts for transmission to the recipient through m encapsulation rounds 330. Each round 330 of encapsulation 314 produces a unique ciphertext 326. In the example shown, each round 330 in the encapsulation process 314 includes the same operations as the encapsulation process 214 of FIG. 2A. Another process may be used for each round of encapsulation than the one shown.

In the example shown, each round 330 of the encapsulation process 314 applies an error vector derivation function 316 (v(•)) to the random seed value 302, a unique identifier i (e.g., an email address or public key of the recipient) associated with the recipient, and an index d indicating the particular round 330 of encapsulation within the process 314 for each recipient to produce an error vector 318 ($e_{i,d}$). In some implementations, the input to the error vector derivation function 316 is a combination (e.g., concatenation) of the random seed value 302, the identifier i, and the index d (e.g., v(s∥i∥d)). In some implementations, the error vector derivation function 316 is a one-way (non-invertible) function that generates an n-bit error vector (an n-dimensional vector of bits) in a pseudorandom manner. For example, the error vector derivation function 316 may apply a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to its input and apply a filter (e.g., a Fisher-Yates shuffle) to the pseudorandom function output to produce a set of t integers ($a_1, a_2, \ldots, a_n$), where each integer is in the range $1 \leq a_i \leq n$ for $a_i \neq a_j$ for $i \neq j$. The set of t integers can then be used to generate the error vector 318. For example, the error vector 318 may have a Hamming weight equal to t, where the $a_i$-th element of the error vector is set to one (1) and the other elements are set to zero (0).

Each round 330 of the encapsulation process 314 then obtains a plaintext value 322 ($x_{i,d}$) based on the random seed value 302 and the error vector 318. In the example shown, the plaintext value 322 is obtained by applying an exclusive-OR (XOR) function to the random seed value 302 and the output of a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) applied to the error vector 318.

The plaintext value 322 and the error vector 318 are then used in an encryption function 324 to produce a ciphertext 326 ($C_i$). In some implementations, the encryption function 324 is a McEliece encryption function implemented according to a McEliece cryptosystem using the QC-MDPC code. For instance, the QC-MDPC code may generate a public key G and private key H, where G is a k×n code generator matrix and H is a (n−k)×n parity check matrix for G. In some implementations, the private key matrix H may be computed first (e.g., by the recipient), and the public key matrix G may be derived from H. The encryption function 324 may use the public key matrix G to generate the ciphertext 326, for example, according to the equation $C_{i,d}=x_{i,d}G+e_{i,d}$, where $C_{i,d}$ is the ciphertext 326, $x_{i,d}$ is the plaintext value 322, G is the public key matrix for the McEliece cryptosystem, and $e_{i,d}$ is the error vector 318.

Figure 3B:
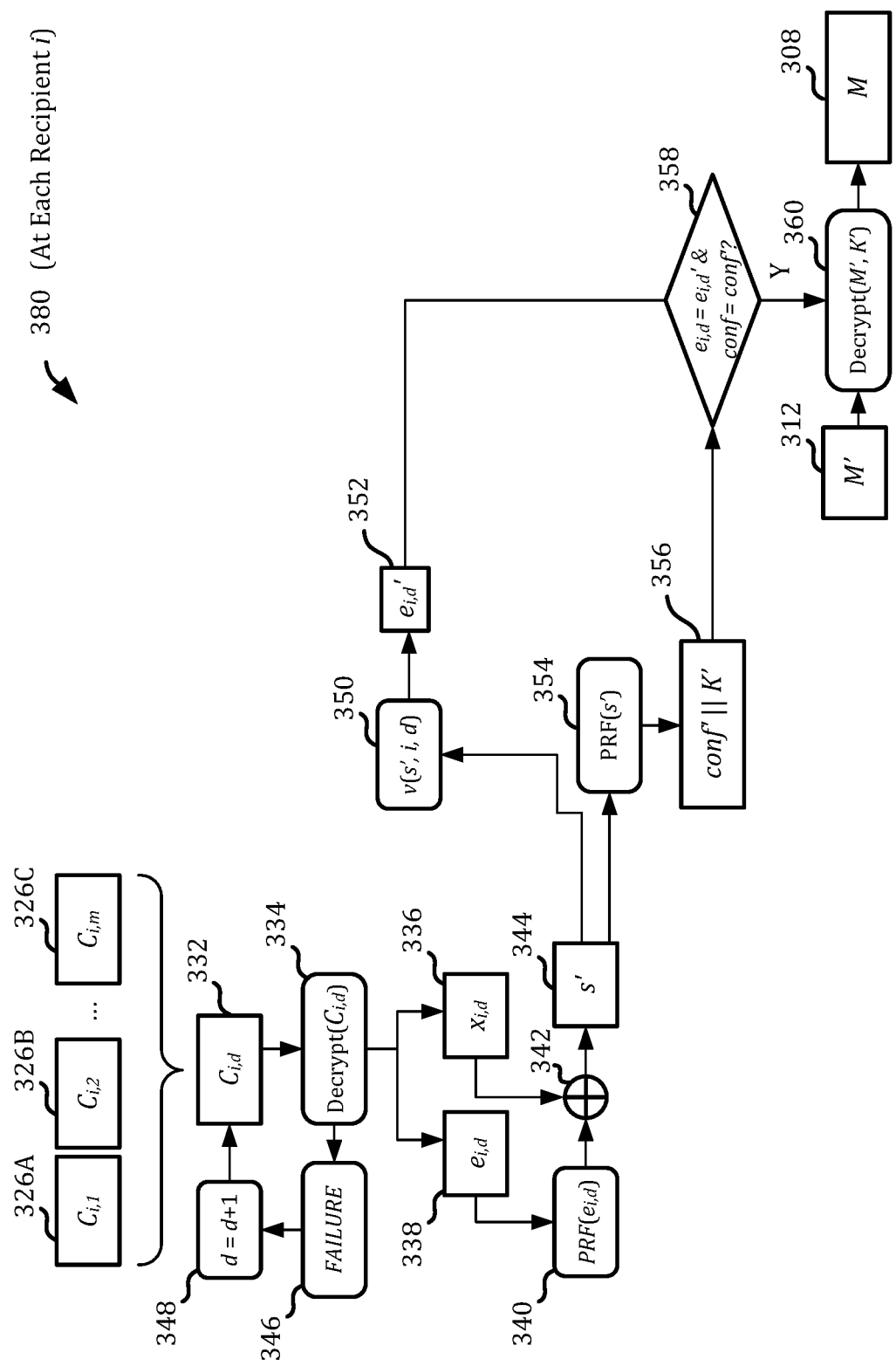
FIG. 3B is a diagram showing an example key decapsulation process corresponding to the key encapsulation process of FIG. 3A.

The ciphertexts $C_{i,d}$ are then transmitted to the respective recipients (e.g., along with the encrypted message 312). The recipient may then use its respective ciphertext $C_{i,d}$ in a decapsulation process to compute the symmetric key K, which is then used to decrypt the encrypted message 312. FIGS. 3B, 3D show example decapsulation processes 380, 390, respectively.

FIG. 3B is a diagram showing an example key decapsulation process 380 corresponding to the key encapsulation process 300A of FIG. 3A. In the example shown, the decapsulation process 380 is performed by each recipient node, which may be implemented similar to the nodes 102, 104 of FIG. 1. For instance, the node may have computational resources (e.g., hardware, software, firmware) that are used to communicate with other nodes in the communication system, and may include a memory, processor, and interface as described above with respect to node 102 of FIG. 1. The node can be implemented in various systems, such as, for example, laptops, desktops, workstations, smartphones, tablets, personal digital assistants, servers, server clusters, mainframes, and other types of computer systems.

In the example shown, a ciphertext 332 is selected from a set of ciphertexts 326 received from a sender. The selected ciphertext 332 may be any one of the ciphertexts 326. In some instances, the first selected ciphertext is the one associated with the first round index (e.g., d=1). A decryption function 334 is applied to the selected ciphertext 332. If successful, the decryption function 334 produces a first decryption function output 336 ($x_{i,d}$) and a second decryption function output 338 ($e_{i,d}$). A reconstructed seed value 344 (s') is then generated from the decryption function outputs 336, 338. In the example shown, this is done by applying a pseudorandom function 340 (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the second decryption function output 338, and then applying an exclusive-OR (XOR) function 342 to the first decryption function output 336 and the output of the pseudorandom function 340. The decryption function 334 may be the inverse of the encryption function 324 of FIG. 3A. In some implementations, the decryption function 334 is a McEliece decryption function implemented according to a McEliece cryptosystem using the QC-MDPC code. For instance, the private key matrix H discussed above may be used to decrypt the selected ciphertext 332, for example, by applying a QC-MDPC decoding algorithm equipped with knowledge of H. In the example shown, the reconstructed seed values 344 generated by each recipient match, even though different decryption function outputs are obtained by each recipient.

An error vector derivation function 350 is then applied to the reconstructed seed value 344 to produce an error vector check value 352 ($e_{i,d}'$), and a pseudorandom function 354 (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) is applied to the reconstructed seed value 344 to produce a string 356 that includes a confirmation check value conf and a symmetric key K'. In the example shown, for instance, the string 356 includes a concatenation of the confirmation check value conf and the symmetric key K'.

The error vector check value 352 is then compared to the second decryption function output 338, and the confirmation check value is compared to a confirmation received from the sender of the encrypted message 312 (e.g., in the same or different transmission). If both values match (conf=conf' and $e_{i,d}=e_{i,d}'$), then the symmetric key K' is provided to a decryption function 360. The decryption function 360 uses the symmetric key K' to decrypt the encrypted message 312 received by the recipient, and produces the unencrypted message 308. The decryption function 360 may be the inverse of the encryption function 308 of FIG. 3A. For instance, in some implementations, the decryption function 360 is implemented according to symmetric cipher system, such as, for example, an Advanced Encryption Standard (AES) cryptosystem.

If both values do not match (conf≠conf' or $e_i \neq e_i'$), then a failure is returned. In some implementations, returning a failure includes delivering an error message, a return code, a flag, or another type of indicator. The indicator may be sent back to the sender of the message in some instances. For example, in some implementations, a failure indicator may be sent back to the sender of the message. In some implementations, however, no indicator is sent to the sender of the message and the indicator is kept only with the recipient.

Sometimes, the decryption function 334 may fail to decrypt the selected ciphertext 332. In such instances, another ciphertext 326 is selected for decryption. For instance, in the example shown, a failure 346 is returned and the index d is incremented to select a new ciphertext from the set of ciphertexts 326. This process may repeat if the decryption function 334 fails to decrypt the newly selected ciphertext 332.

Figure 3C:
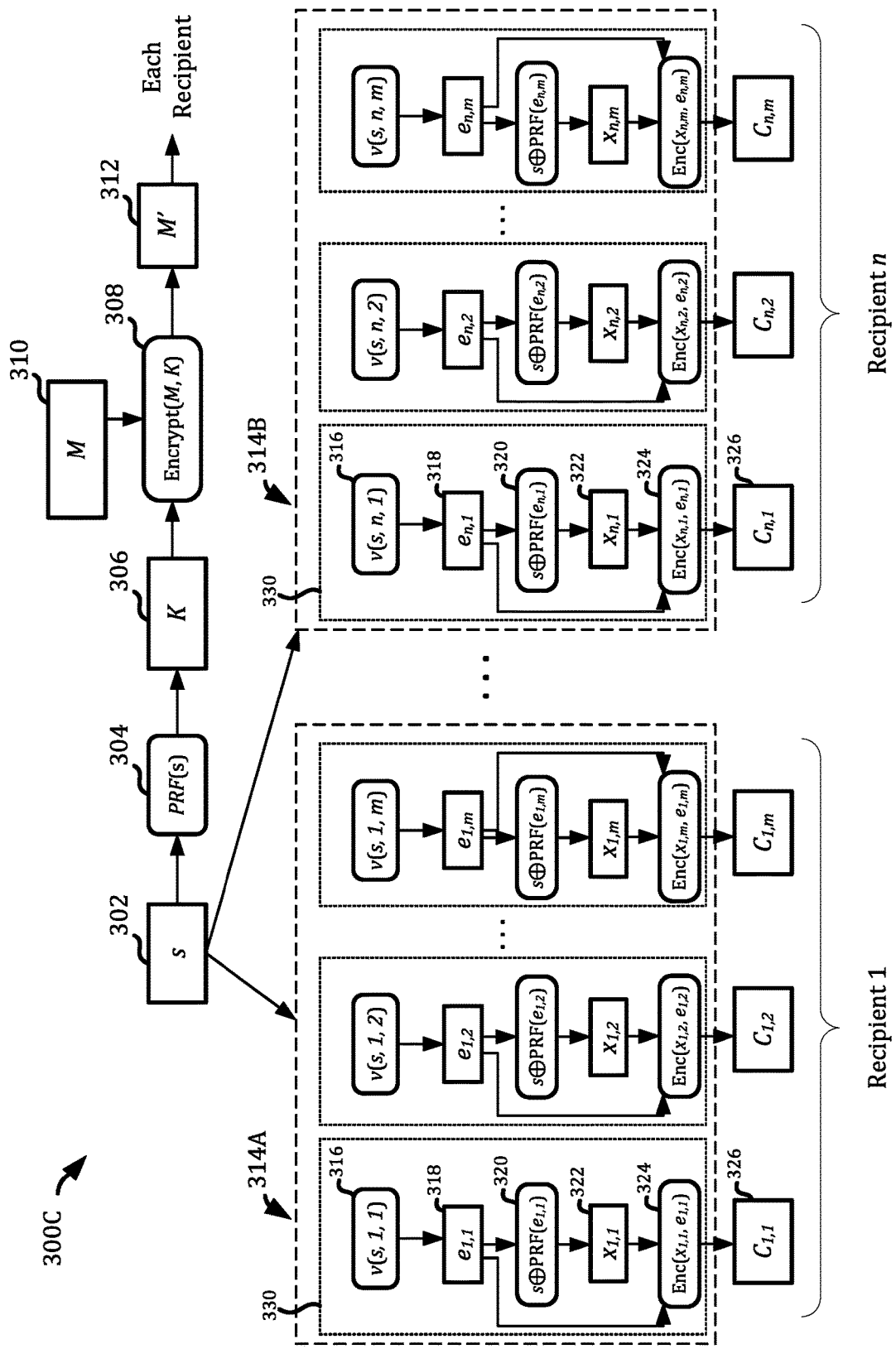
FIG. 3C is a diagram showing another example key encapsulation process.
Figure 3D:
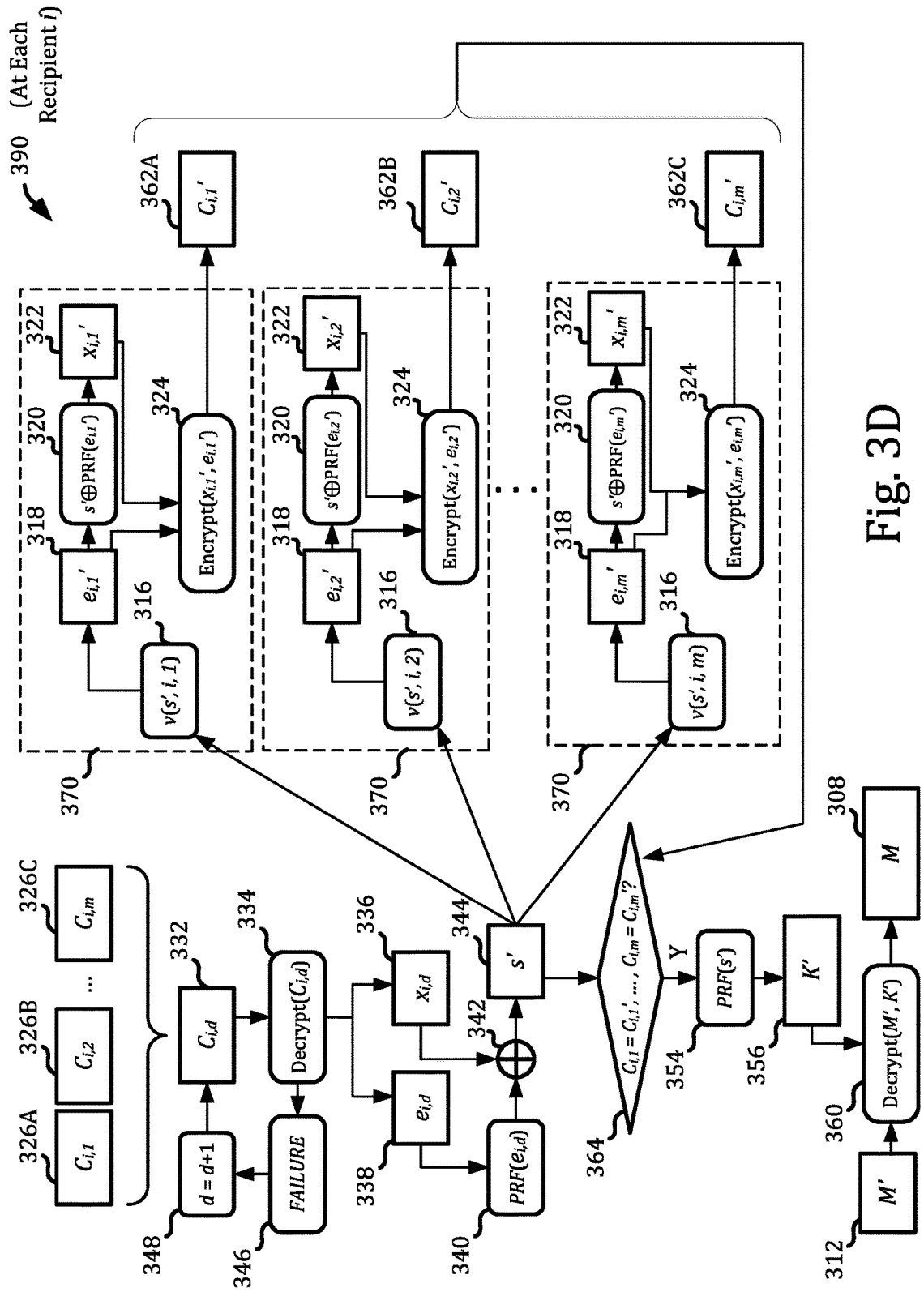
FIG. 3D is a diagram showing an example key decapsulation process corresponding to the key encapsulation process of FIG. 3C.

FIG. 3C is a diagram showing an example multi-round key encapsulation process 300C. The example process 300C is the same as process 300A of FIG. 3A, but without the generation of a confirmation value. That is, all operations in the example process 300C shown in FIG. 3C are the same as the example process 300A of FIG. 2A, except that the pseudorandom function 304 produces an output that includes a symmetric key K without a confirmation value conf.

FIG. 3D is a diagram showing an example key decapsulation process 390 corresponding to the key encapsulation process 300C of FIG. 3C. In the example shown, the decapsulation process is performed by each recipient node, which may be implemented similar to the nodes 102, 104 of FIG. 1. For instance, the node may have computational resources (e.g., hardware, software, firmware) that are used to communicate with other nodes in the communication system, and may include a memory, processor, and interface as described above with respect to node 102 of FIG. 1. The node can be implemented in various systems, such as, for example, laptops, desktops, workstations, smartphones, tablets, personal digital assistants, servers, server clusters, mainframes, and other types of computer systems.

The example decapsulation process 390 performs the same operations as the decapsulation process 380 to obtain a reconstructed seed value 344 (s'). However, the decapsulation process 390 uses the reconstructed seed value 344 in multiple encapsulation rounds 370 to obtain ciphertext check values 362. The encapsulation rounds 370 may be the same as the encapsulation rounds 330 performed by the sender (e.g., as shown in FIG. 3A). In addition, like the encapsulation process 380, a pseudorandom function 354 (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) is applied to the reconstructed seed value 344 to produce a string 356 that includes a symmetric key K'.

The ciphertext check values 362 are then compared to the ciphertexts 326. If the values match ($C_{i,1}=C'_{i,1}$, $C_{i,2}=C'_{i,2}$, ..., and $C_{i,m}=C'_{i,m}$), then the symmetric key K' is provided to a decryption function 30. The decryption function 360 uses the symmetric key K' to decrypt the encrypted message 312 received by the recipient, and produces the unencrypted message 308. The decryption function 360 may be the inverse of the encryption function 308. For instance, in some implementations, the decryption function 360 is implemented according to symmetric cipher system, such as, for example, an Advanced Encryption Standard (AES) cryptosystem.

If the values do not match ($C_{i,1} \neq C'_{i,1}$, $C_{i,2} \neq C'_{i,2}$, ..., and $C_{i,m} \neq C'_{i,m}$), then a failure is returned. In some implementations, returning a failure includes delivering an error message, a return code, a flag, or another type of indicator. The indicator may be sent back to the sender of the message in some instances. For example, in some implementations, a failure indicator may be sent back to the sender of the message. In some implementations, however, no indicator is sent to the sender of the message and the indicator is kept only with the recipient.

Although described above in a multi-recipient scenario, the examples shown in FIGS. 2-3 can be used in a single recipient scenario as well. In some instances, the same processes may be used as described above. In some instances, the encapsulation and decapsulation processes may be performed in the same manner as described above, but without the use of the identifier i as an input to particular functions. For instance, rather than being a function of the random seed value 202 and the identifier i as shown in FIG. 2A, the error vector derivation function 216 may be a function of the random seed value 202 alone. As another example, rather than being a function of the random seed value 302, the identifier i, and the round index d, the error vector derivation function 316 in each round may be a function of the random value 302 and the round index d. The error vector derivation functions of the corresponding decapsulation functions may be similarly modified for a single recipient scenario.

Figure 4:
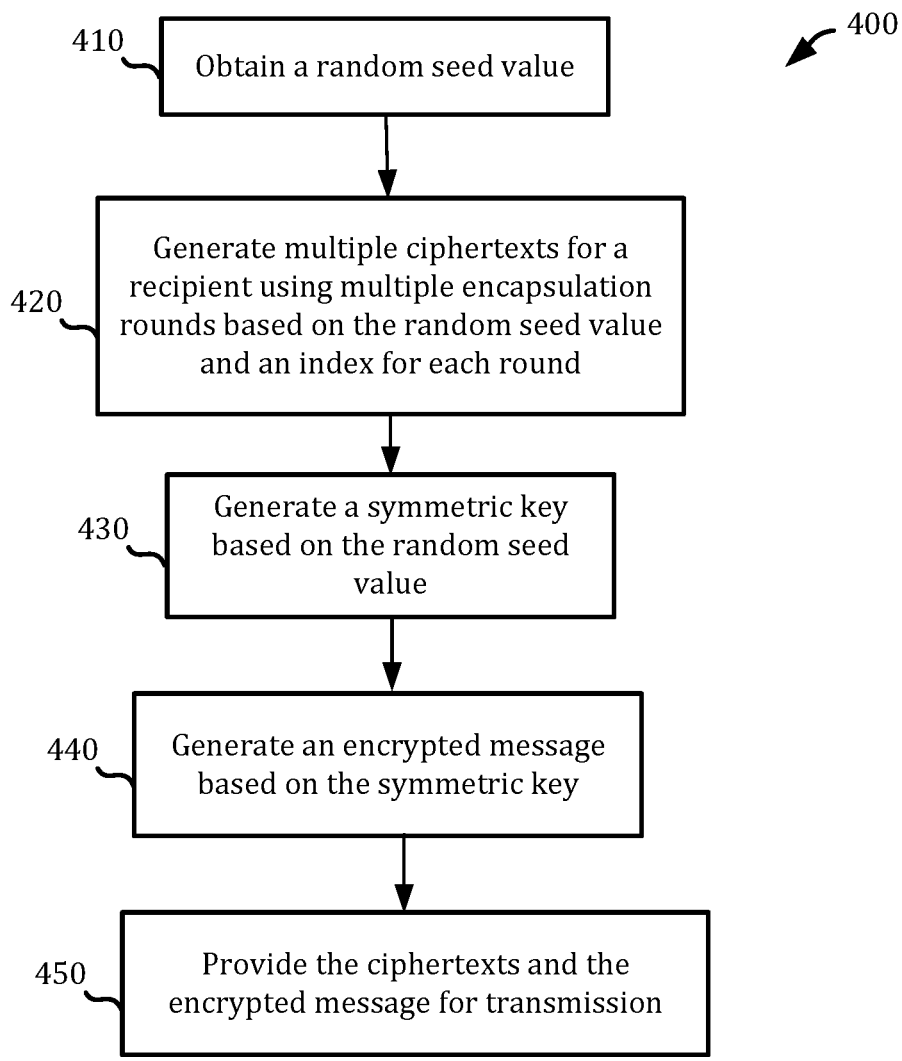
FIG. 4 is a flow diagram showing an example key encapsulation process.

FIG. 4 is a flow diagram showing an example of a multi-round key encapsulation process 400. The example process 400 can be performed, for example, by computer systems that can exchange information over a communication channel. For instance, operations in the multi-round key encapsulation process 400 may be performed by the node 102 in the example communication system 100 shown in FIG. 1, or in another type of communication system. The example process 400 may exchange information with other processes. The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in parallel, iterated or otherwise repeated or performed in another manner. In some examples, the process 400 is secure against quantum-enabled adversaries such as, for example, the quantum-enabled adversary 108 shown in FIG. 1. The example process 400 may also provide security against classically-enabled adversaries who do not have access to quantum computers or other quantum resources.

The example multi-round key encapsulation process 400 may include multiple rounds of encapsulation for a recipient using the same seed value in each round. Example implementations of the process 400 are shown, e.g., in FIGS. 3A and 3C. In the process 400 in FIG. 4, at 410, a random seed value is obtained, (e.g., s in FIGS. 3A and 3C). The random seed value may be obtained, for instance, from a pseudorandom number generator or another source of randomness (e.g., provided by an operating system, etc.).

At 420, multiple ciphertexts are generated for a recipient using multiple rounds of encapsulation (e.g., encapsulation rounds 330 in FIGS. 3A and 3C). For example, each encapsulation round m generates a ciphertext (e.g., Cn,m in FIGS. 3A and 3C) for the recipient n based on the random seed value and an additional value. In some examples, the additional value is an index (d) indicating the round of encapsulation or another value associated with a current round of encapsulation.

In some cases, each encapsulation round at 420 includes applying an error vector derivation function (e.g., at 316 in FIGS. 3A and 3C) to a combination of the random seed value and the additional value for the encapsulation round to produce an error vector (e.g., $e_{n,m}$ in FIGS. 3A and 3C) for the encapsulation round; generating a plaintext value (e.g., $x_{n,m}$ in FIGS. 3A and 3C) based on the random seed value and the error vector for the encapsulation round, and using the plaintext value and the error vector for the encapsulation round in an encryption function (e.g., 324 in FIGS. 3A and 3C) to produce a ciphertext for the encapsulation round (m).

In some implementations, applying the error vector derivation function includes applying a pseudorandom function to the combination of the random seed value and the additional value to produce a pseudorandom function output; applying a filter to the pseudorandom function output to produce a filtered pseudorandom function output of t integers; and generating the error vector based on the filtered pseudorandom function output. In some cases, the error vector has a Hamming weight equal to t, wherein respective positions of the nonzero elements of the error vector are indicated by the filtered pseudorandom function output.

In some cases, ciphertexts are generated for multiple recipients at 420, and multiple ciphertexts may be generated for each of the recipients. For instance, in FIGS. 3A and 3C, a first set of ciphertexts are generated at 314A for a first recipient, and a second set of ciphertexts are generated at 314B for a second recipient. In this example, each recipient is identified by the respective identifier (i), and the ciphertexts and the encrypted message for each of the multiple recipients are provided for transmission to the respective recipient.

In some implementations, each encapsulation round at 420 generates a respective ciphertext based on the random seed value and an identifier (i) of the recipient. For example, each encapsulation round may include applying an error vector derivation function to a combination of the random seed value, the index (d), and the identifier (i) to produce an error vector. A plaintext value (e.g., $x_{n,m}$ in FIGS. 3A and 3C) can be generated based on the random seed value and the error vector, and the plaintext value and the error vector can be used in an encryption function (e.g., at 324 in FIGS. 3A and 3C) to produce the ciphertext (e.g., 326 in FIGS. 3A and 3C).

At 430, a symmetric key (e.g., K in FIGS. 3A and 3C) is generated based on the random seed value. In some cases, generating the symmetric key includes applying a key derivation function (e.g., at 304 in FIGS. 3A and 3C) to the random seed value to produce a key derivation output that includes the symmetric key. In some cases, e.g., in the example shown in FIG. 3C, the key derivation function output includes the symmetric key and a confirmation value (e.g., conf II K in FIG. 3C).

At 440, an encrypted message (e.g., M' in FIGS. 3A and 3C) is generated, e.g., from an unencrypted message (e.g., M in in FIGS. 3A and 3C). The symmetric key is used to generate the encrypted message. For instance, the encrypted message may be generated as described with respect to 308 in FIGS. 3A and 3C.

At 450, the ciphertexts and the encrypted message are provided for transmission, for example, for transmission between nodes in a communication system. For instance, the ciphertexts and the encrypted message can be provided for transmission to the recipient over a communication network. In some cases, the encrypted message is sent to multiple recipients, and each recipient receives a respective set of ciphertexts generated for that individual recipient. In cases where a confirmation value is generated, the confirmation value may be sent to the recipient(s) with the encrypted message and ciphertexts. Or the encrypted message and ciphertexts may be sent without a confirmation value in some cases.

Figure 5:
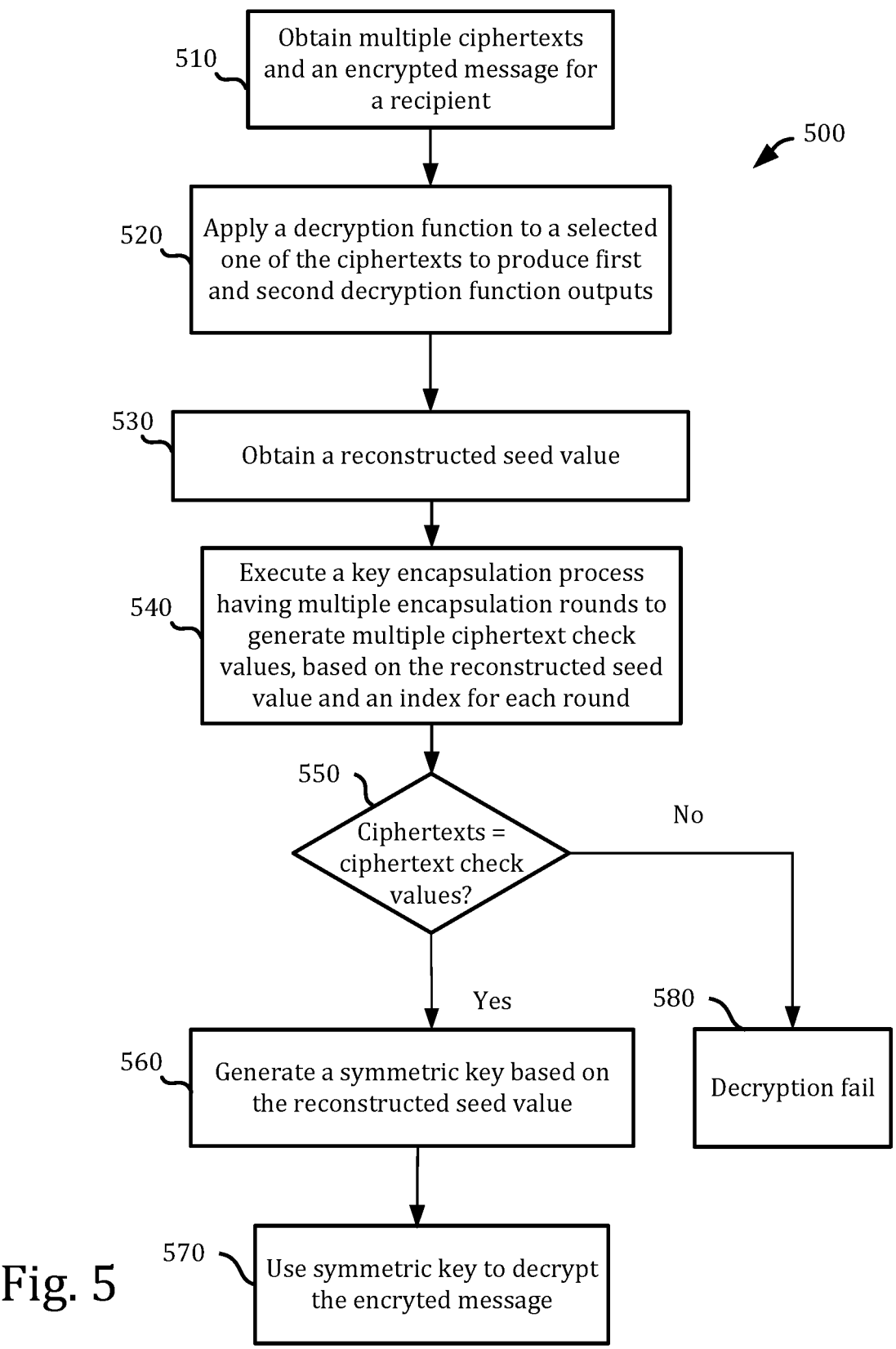
FIG. 5 is a flow diagram showing an example key decapsulation process.

FIG. 5 is a flow diagram showing an example multi-round key decapsulation process 500. The example process 500 can be performed, for example, by a computer system that can exchange information over a communication channel. For instance, operations in the process 500 may be performed by one or more multiple recipient nodes 104A, 104B ... 104N, in the example communication system 100 shown in FIG. 1, or in another type of communication system. The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in parallel, iterated or otherwise repeated or performed in another manner. In some examples, the process 500 is secure against quantum-enabled adversaries such as, for example, the quantum-enabled adversary 108 shown in FIG. 1. The example process 500 may also provide security against classically-enabled adversaries who do not have access to quantum computers or other quantum resources.

In the example multi-round key decapsulation process 500, multiple ciphertexts have been generated for a recipient using the same random value s in each round of encapsulation, e.g., using the example multi-round encapsulation process shown in FIG. 3C. In this example, the encryption process does not generate a confirmation value (e.g., at 306), and thus the recipient does not use a confirmation value in the decryption process. An example implementation of the process 500 is shown in FIG. 3D.

At 510, multiple ciphertexts (e.g., 326A, 326B, 326C in FIG. 3D) and an encrypted message (e.g., M' 312 in FIG. 3D) are obtained. The ciphertexts and the encrypted message were transmitted between nodes in a communication system, and may be obtained, for example, from memory, storage, a remote device or another location. For example, the multiple ciphertexts and the encrypted message may be transmitted by a node, e.g., node 102 in FIG. 1, to one or more multiple recipient nodes, e.g., 104A, 104B ... 104N in FIG. 1. Each recipient node may perform the decapsulation process 500.

At 520, a decryption function is applied to a selected one of the ciphertexts to produce a first decryption function output (e.g., $x_{i,d}$ 336 in FIG. 3D) and a second decryption function output (e.g., $e_{i,d}$ 338 in FIG. 3D). For example, in FIG. 3D, a decryption function applied at 334 produces the first decryption function output 336 and the second decryption function output 338. In some instances, the decryption function is a McEliece decryption function. In some cases, a failure is detected when applying the decryption function to a first selected ciphertext. In response to detecting the failure, the decryption function can be applied (e.g., after an index d is incremented at 348 in FIG. 3D) to a second selected one of the ciphertexts to produce the first and second decryption function outputs. This may be repeated, for example, until a successful decryption is detected.

At 530, a reconstructed seed value (e.g., s' 344 in FIG. 3D) is obtained based on the first and second decryption function outputs. For instance, the reconstructed seed value may be obtained as shown in FIG. 3D. At 540, a key encapsulation process is executed to generate multiple ciphertext check values (e.g., 362A, 362B, 362C in FIG. 3D). The key encapsulation process includes multiple encapsulation rounds (e.g., 370 in FIG. 3D), and each encapsulation round generates a respective ciphertext check value based on the reconstructed seed value and an additional value associated with the encapsulation round. For instance, the additional value may include an index (d) indicating a current encapsulation round. In some cases, the additional value further includes an identifier (i) of the recipient of the encrypted message.

In some cases, at 540, in each encapsulation round, an error vector derivation function (e.g., at 316 in FIG. 3D) is applied to a combination of the reconstructed seed value and the additional value to produce an error vector (e.g., 318 in FIG. 3D). In any case, the error vector derivation function can be applied as described above with respect to FIG. 4, as appropriate. A plaintext value (e.g., 322 in FIG. 3D) can be generated based on the reconstructed seed value and the error vector, and the plaintext value and the error vector can be used in an encryption function (e.g., at 324 in FIG. 3D) to produce the ciphertext check value.

At 550, the ciphertexts (e.g., the ciphertexts obtained at 510) are compared with the ciphertext check values (e.g., the ciphertext check values generated at 530). If the obtained ciphertexts match the respective generated ciphertext check values at 550, then the process 500 proceeds to 560 and 570.

At 560, a symmetric key (e.g., K' 356 in FIG. 3D) is generated based on the reconstructed seed value. In some cases, generating the symmetric key based on the reconstructed seed value includes applying a pseudorandom function (e.g., at 354 in FIG. 3D) to the reconstructed seed value to produce a pseudorandom function output that includes the symmetric key. And at 570, the symmetric key is used to decrypt the encrypted message (the encrypted message obtained at 510). For instance, the encrypted message may be decrypted as described with respect to 324 in FIG. 3D.

If any of the ciphertexts does not match the corresponding ciphertext check value at 550, then the process 500 proceeds to 580. At 580, the process 500 can detect a failure in the decryption of the encrypted message. The process 500 may then terminate, repeat, perform a remedial action, or proceed otherwise.

Figure 6:
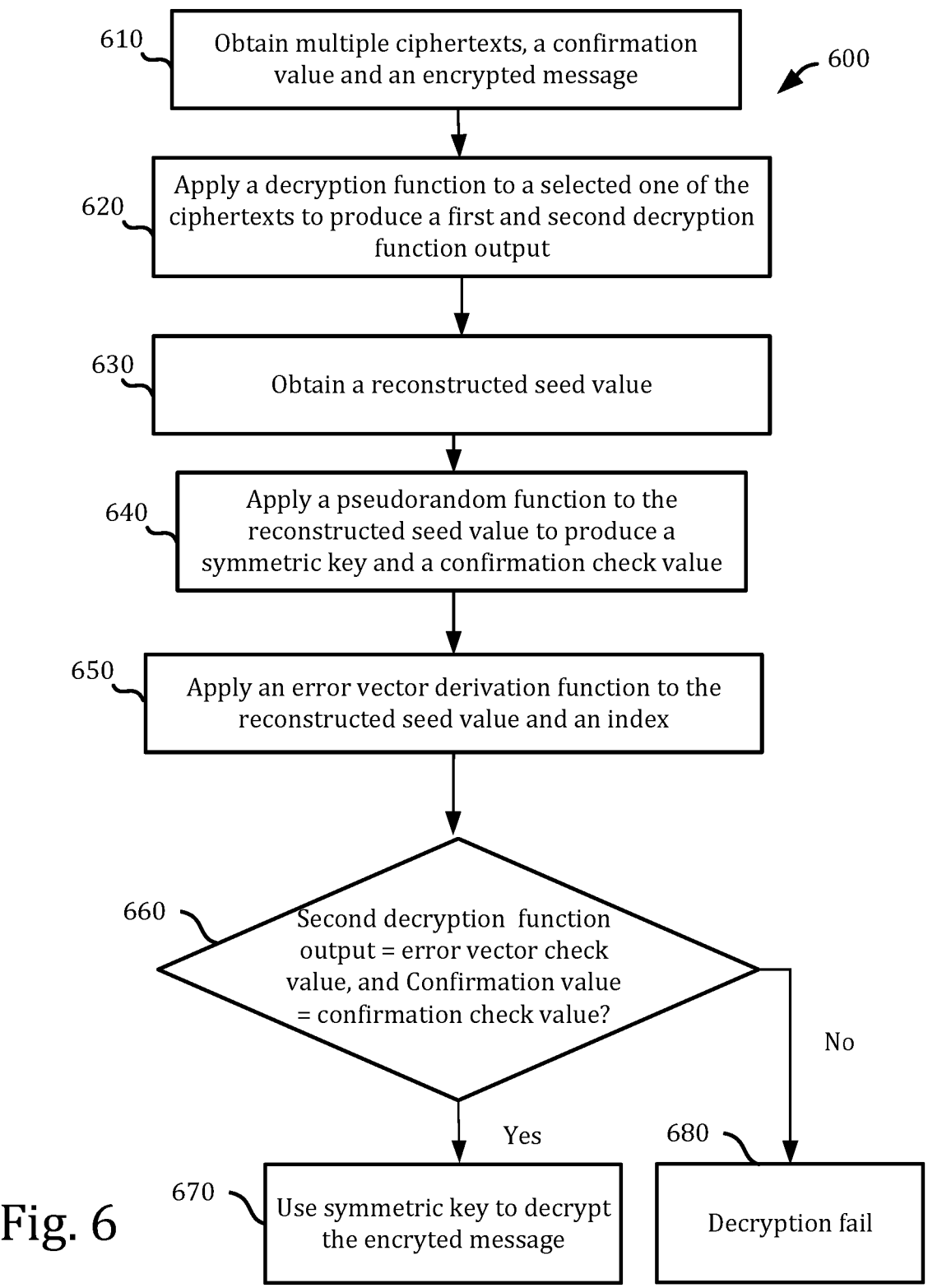
FIG. 6 is a flow diagram showing another example key decapsulation process.

FIG. 6 is a flow diagram showing another example multi-round key decapsulation process 600. The example process 600 can be performed, for example, by computer systems that can exchange information over a communication channel. For instance, operations in the process 600 may be performed by one or more multiple recipient nodes 104A, 104B . . . 104N, in the example communication system 100 shown in FIG. 1, or in another type of communication system. The example process 600 may include additional or different operations, and the operations may be performed in the order shown or in another order. In some cases, one or more of the operations shown in FIG. 6 are implemented as processes that include multiple operations, sub-processes or other types of routines. In some cases, operations can be combined, performed in parallel, iterated or otherwise repeated or performed in another manner. In some examples, the process 600 is secure against quantum-enabled adversaries such as, for example, the quantum-enabled adversary 108 shown in FIG. 1. The example process 600 may also provide security against classically-enabled adversaries who do not have access to quantum computers or other quantum resources.

In the example multi-round key decapsulation process 600, multiple ciphertexts have been generated for a recipient using the same random value s in each round of encapsulation, e.g., using the example process shown in FIG. 3A. In this example, the encapsulation process generated a confirmation value (e.g., conf at 306 in FIG. 3A), and the recipient receives the confirmation value and uses it in the decryption process. An example implementation of the decapsulation process 600 is shown in FIG. 3B.

At 610, multiple ciphertexts (e.g., 326A, 326B, 326C in FIG. 3B), a confirmation value (e.g., conf at 358 in FIG. 3B), and an encrypted message (e.g., M' 312 in FIG. 3B) are obtained. The ciphertexts, the confirmation value, and the encrypted message were transmitted between nodes in a communication system, and may be obtained, for example, from memory, storage, a remote device or another location. For example, multiple ciphertexts, the confirmation value, and the encrypted message may be transmitted by a node, e.g., node 102 in FIG. 1, to one or more multiple recipient nodes, e.g., 104A, 104B . . . 104N in FIG. 1. Each recipient node may perform the decapsulation process 600.

At 620, a decryption function (e.g., at 334 in FIG. 3B) is applied to a selected one of the ciphertexts (e.g., the ciphertext $C_{i,d}$ 332 in FIG. 3B) to produce a first decryption function output (e.g., $x_{i,d}$ 336 in FIG. 3B) and a second decryption function output (e.g., $e_{i,d}$ 338 in FIG. 3B). In some cases, the decryption function is a McEliece decryption function. In some cases, a failure is detected in applying the decryption function to a first selected one of the ciphertexts. In response to detecting the failure, the decryption function can be applied (e.g., after an index d is incremented at 348 in FIG. 3B) to a second selected one of the ciphertexts to produce the first and second decryption function outputs. This may be repeated, for example, until a successful decryption is detected.

At 630, a reconstructed seed value (e.g., s' 344 in FIG. 3B) is obtained based on the first and second decryption function outputs. For instance, the reconstructed seed value may be obtained as shown in FIG. 3B. At 640, a pseudorandom function (e.g., at 354 in FIG. 3B) is applied to the reconstructed seed value to obtain a symmetric key (e.g., K' in FIG. 3B) and a confirmation check value (e.g., conf' in FIG. 3B).

At 650, an error vector derivation function (e.g., at 350 in FIG. 3B) is applied to a combination of the reconstructed seed value and an additional value to obtain an error vector check value (e.g., 352 in FIG. 3B). The additional value may include an index (d) indicating a current encapsulation round associated with the selected ciphertext. In some cases, the error vector derivation function is applied to the reconstructed seed value, the index of the selected ciphertext, and an identifier (i) of the recipient of the encrypted message to obtain the error vector check value. In any case, the error vector derivation function can be applied as described above with respect to FIG. 4, as appropriate.

At 660, the confirmation value is compared with the confirmation check value, and the second decryption function output (the error vector) is compared with the error vector check value (e.g., at 358 in FIG. 3B). If the compared values match at 660, then the process 600 proceeds to 670. At 670, the symmetric key is used to decrypt the encrypted message. For instance, the encrypted message may be decrypted as described with respect to 360 in FIG. 3B.

If the compared values do not match at 660, then the process 600 proceeds to 680. At 680, the process 600 can detect a failure in the decryption of the encrypted message. The process 600 may then terminate, repeat, perform a remedial action, or proceed otherwise.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semi-conductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, key encapsulation and decapsulation processes are used in a public key cryptosystem.

In a first example, a random seed value (s) is obtained, and a key encapsulation process is executed to generate multiple ciphertexts. The key encapsulation process includes multiple encapsulation rounds, with each encapsulation round generating a respective ciphertext (Cn,m) based on the random seed value and an additional value. In some cases, the additional value is an index (d) of the encapsulation round. A symmetric key is generated based on the random seed value, and an encrypted message is generated based on the symmetric key. The ciphertexts and the encrypted message are provided for transmission between nodes in a communication system.

Implementations of the first example may include one or more of the following features. Each encapsulation round may include applying an error vector derivation function to a combination of the random seed value (s) and the index (d) to produce an error vector; a plaintext value may be generated based on the random seed value and the error vector; and the plaintext value and the error vector may be used in an encryption function to produce a ciphertext. Applying the error vector derivation function may include applying a pseudorandom function to the combination of the random seed value and the index (d) to produce a pseudorandom function output, applying a filter to the pseudorandom function output to produce a filtered pseudorandom function output of t integers, and generating the error vector based on the filtered pseudorandom function output. The error vector may have a Hamming weight equal to t, and respective positions of the nonzero elements of the error vector may be indicated by the filtered pseudorandom function output. Generating the symmetric key based on the random seed value may include applying a key derivation function to the random seed value to produce a key derivation function output that includes the symmetric key. The key derivation function output may include the symmetric key and a confirmation value. The encryption function may include a McEliece encryption function and, using the plaintext value and the error vector in the encryption function may include using the error vector and a public key to encrypt the plaintext value according to a McEliece cryptosystem.

Implementations of the first example may include one or more of the following features. Each encapsulation round may generate a respective ciphertext based on the random seed value and the additional value for the encapsulation round, in which the additional value further includes an identifier (i) of the recipient. Each encapsulation round may include applying an error vector derivation function to a combination of the random seed value, the index (d), and the identifier (i) to produce an error vector, generating a plaintext value based on the random seed value and the error vector and using the plaintext value and the error vector in an encryption function to produce a ciphertext. The key encapsulation process to generate multiple ciphertexts may be executed for multiple recipients, where each recipient is identified by the respective identifier. The ciphertexts and the encrypted message may be provided for each of the multiple recipients.

In a second example, multiple ciphertexts and an encrypted message transmitted between nodes in a communication network are obtained. A decryption function is applied to a selected one of the ciphertexts to produce a first decryption function output and a second decryption function output. A reconstructed seed value is obtained based on the first and second decryption function outputs, and a key encapsulation process is executed to generate multiple ciphertext check values. The key encapsulation process includes multiple encapsulation rounds, with encapsulation each round generating a respective ciphertext based on the reconstructed seed value and an index (d) of the encapsulation round. A symmetric key is generated based on the reconstructed seed value, and the ciphertexts are compared with the ciphertext check values. The symmetric key is used to decrypt the encrypted message in response to a determination that the ciphertext check values match the ciphertexts.

Implementations of the second example may include one or more of the following features. A failure may be detected in the application of the decryption function to a first selected ciphertext of the ciphertexts, and in response to detecting the failure, the decryption function may be applied to a second ciphertext of the ciphertexts. The decryption function may be a McEliece decryption function. Each encapsulation round may include applying an error vector derivation function to a combination of the reconstructed seed value and the index (d) to produce an error vector, generating a plaintext value based on the reconstructed seed value and the error vector, and using the plaintext value and the error vector in an encryption function to produce a ciphertext check value. Applying the error vector derivation function may include applying a pseudorandom function to the combination of the reconstructed seed value and the index (d) to produce a pseudorandom function output, applying a filter to the pseudorandom function output to produce a filtered pseudorandom function output of t integers, and generating the error vector based on the filtered pseudorandom function output. The error vector may have a Hamming weight equal to t, and respective positions of the nonzero elements of the error vector may be indicated by the filtered pseudorandom function output. Generating the symmetric key based on the reconstructed seed value may include applying a pseudorandom function to the reconstructed seed value to produce a pseudorandom function output that includes the symmetric key. The additional value may further comprises an identifier (i) of the recipient of the encrypted message.

In a third example, multiple ciphertexts, a confirmation value, and an encrypted message transmitted between nodes in a communication network are obtained. A decryption function is applied to a selected one of the ciphertexts to produce a first decryption function output and a second decryption function output. The second decryption function output includes an error vector. A reconstructed seed value is obtained based on the first and second decryption function outputs. An error vector derivation function is applied to a combination of the reconstructed seed value and an index (d) of the selected ciphertext to obtain an error vector check value, and a pseudorandom function is applied to the reconstructed seed value to obtain a symmetric key and a confirmation check value. The confirmation value is compared with the confirmation check value, and the error vector is compared with the error vector check value. The symmetric key is used to decrypt the encrypted message in response to a determination that the confirmation value matches the confirmation check value and the error vector matches the error vector check value.

Implementations of the third example may include one or more of the following features. A failure may be detected in the application of the decryption function to a first ciphertext of the ciphertexts, and in response to detecting the failure, the decryption function may be applied to a second ciphertext of the ciphertexts. The decryption function may be a McEliece decryption function. Applying the error vector derivation function to the combination of the reconstructed seed value and the index (d) may include applying a pseudorandom function to the combination of the reconstructed seed value and the index (d) to produce a pseudorandom function output, applying a filter to the pseudorandom function output to produce a filtered pseudorandom function output of t integers, and generating the error vector check value based on the filtered pseudorandom function output. The error vector check value may have a Hamming weight equal to t, and respective positions of the nonzero elements of the error vector check value may be indicated by the filtered pseudorandom function output. The error vector derivation function may be applied to a combination of the reconstructed seed value, the index (d) of the selected ciphertext, and an identifier (i) of the recipient of the encrypted message to obtain an error vector check value.

In a fourth example, a random seed value is obtained. An error vector derivation function is applied to a combination of a random value and an additional value to produce an error vector. The additional value may be an identifier of a recipient of an encrypted message. A plaintext value is obtained based on the random value. The error vector and the plaintext value are used in an encryption function to produce a ciphertext, and a pseudorandom function is applied to the random value to produce a key derivation function output that includes a symmetric key. The symmetric key is used to generate an encrypted message based on an unencrypted message. The ciphertext and the encrypted message are provided for transmission between nodes in a communication network.

Implementations of the fourth example may include one or more of the following features. The random seed may be used for multiple recipients, and the additional value may include an identifier (i) of a respective recipient. The error vector and the plaintext value of each respective recipient may be used in an encryption function to produce a ciphertext for each respective recipient, and the ciphertext for each respective recipient of the multiple recipients and the encrypted message can be provided for transmission, for each recipient. In some cases, multiple ciphertexts are produced for each respective recipient by multiple rounds of encapsulation, and the additional value comprises an index (d) indicating the current round of encapsulation for the respective recipient. In some implementations, multiple ciphertexts for each respective recipient of the multiple recipients are combined into a respective ciphertext for each respective recipient for transmission in the communication network. In some cases, for each of the multiple rounds of encapsulation, a ciphertext is produced for the respective round indicated by the index for each respective recipient. Applying the error vector derivation function to the combination of the random value and the index may include, for each of the multiple rounds of encapsulation for a respective recipient, applying a pseudorandom function to the combination to produce a pseudorandom function output, applying a filter to the pseudorandom function output to produce a filtered pseudorandom function output that has t integers, and generating the error vector for the respective round based on the filtered pseudorandom function output. The error vector may have a Hamming weight equal to t. Respective positions of the nonzero elements of the error vector may be indicated by the filtered pseudorandom function output. The key derivation function output may include a symmetric key and a confirmation value. The encryption function may include a McEliece encryption function, and using the error vector in the encryption function may include using the error vector and a public key to encrypt the plaintext value according to a McEliece cryptosystem.

In a fifth example, a ciphertext, a confirmation value, and an encrypted message, transmitted between nodes in a communication system, are obtained. A decryption function is applied to the ciphertext to produce a first decryption function output and a second decryption function output, and a reconstructed seed value is obtained based on the first and second decryption function outputs. A pseudorandom function is applied to the reconstructed seed value to produce a pseudorandom function output that includes a symmetric key and a confirmation check value. An error vector derivation function is applied to a combination of the reconstructed seed value and an additional value, that may be an identifier of the recipient, to produce an error vector check value. The second decryption function output is compared with the error vector check value, and the confirmation value is compared with the confirmation check value. The symmetric key is used to decrypt the encrypted message in response a determination that the second decryption function output matches the error vector check value and the confirmation check value matches the confirmation value.

Implementations of the fifth example may include one or more of the following features. An encapsulated ciphertext comprised of multiple ciphertexts can be obtained, and the decryption function can be applied to a respective one of the multiple ciphertexts to produce a first decryption function output and a second decryption function output. When the decryption function fails, the decryption function can be performed on the next respective one of the multiple ciphertexts. The additional value may include an index indicating the respective one of the multiple ciphertexts, and applying an error vector derivation function to the combination of the reconstructed seed value and the additional value may include, applying a pseudorandom function to the combination of the reconstructed seed value and the additional value to produce a pseudorandom function output, applying a filter to the pseudorandom function output to produce a filtered pseudorandom function output of t integers; and generating the error vector check value for the respective one of the multiple ciphertexts based on the filtered pseudorandom function output. The decryption function may be a McEliece decryption function.

In a sixth example, a ciphertext and an encrypted message transmitted between nodes in a communication system are obtained. A decryption function is applied to the ciphertext to produce a first decryption function output and a second decryption function output, and a reconstructed seed value is obtained based on the first and second decryption function outputs. A key encapsulation process is executed to generate a ciphertext check value based on the reconstructed seed value an additional value, that may be an identifier of the recipient. A symmetric key is generated based on the reconstructed seed value, and the ciphertext is compared with the ciphertext check value. The symmetric key is used to decrypt the encrypted message in response to a determination that the ciphertext check value matches the ciphertext.

Implementations of the sixth example may include one or more of the following features. Executing the key encapsulation process may include applying an error vector derivation function to a combination of the reconstructed seed value and an additional value to produce an error vector, generating a plaintext value based on the reconstructed seed value and the error vector, and using the plaintext value and the error vector in an encryption function to produce the ciphertext check value. Generating the symmetric key based on the reconstructed seed value may include applying a pseudorandom function to the reconstructed seed value to produce a pseudorandom function output that includes the symmetric key. Obtaining the ciphertext may include obtaining an encapsulated ciphertext comprised of multiple ciphertexts, and applying a decryption function to the ciphertext may include applying the decryption function to a respective one of the multiple ciphertexts to produce the first decryption function output and the second decryption function output. When the decryption function fails, the decryption function can be performed on the next respective one of the multiple ciphertexts. The additional value may include an index indicating the respective one of the multiple ciphertexts, and applying the error vector derivation function to the combination of the reconstructed seed value and the additional value may include applying a pseudorandom function to the combination of the reconstructed seed value and the additional value to produce a pseudorandom function output, applying a filter to the pseudorandom function output to produce a filtered pseudorandom function output of t integers, and generating the error vector check value based on the filtered pseudorandom function output for the respective one of the number of ciphertexts. The error vector check value may have a Hamming weight equal to t, and respective positions of the nonzero elements of the error vector check value are indicated by the filtered pseudorandom function output. The decryption function may be a McEliece decryption function.

In some implementations, a computing system includes a data processing apparatus and memory storing instructions that are operable when executed by the data processing apparatus to perform one or more operations of the first, second, third, fourth, fifth and sixth examples.

In some implementations, a computer-readable medium stores instructions that are operable when executed by a data processing apparatus to perform one or more operations of the first, second, third, fourth, fifth and sixth examples.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A key encapsulation method, comprising:
   obtaining a random seed value;
   executing a key encapsulation process to generate multiple ciphertexts for a recipient, the key encapsulation process comprising multiple encapsulation rounds, each encapsulation round generating a respective ciphertext based on the random seed value and an additional value for the encapsulation round, the additional value comprising an index indicating the encapsulation round;
   wherein each encapsulation round comprises:
      applying an error vector derivation function to a combination of the random seed value and the additional value for the encapsulation round to produce an error vector, wherein applying the error vector derivation function comprises:
         applying a pseudorandom function to the combination of the random seed value and the additional value to produce a pseudorandom function output;
         applying a filter to the pseudorandom function output to produce a filtered pseudorandom function output of t integers; and
         generating the error vector based on the filtered pseudorandom function output:
      generating a plaintext value based on the random seed value and the error vector; and
      using the plaintext value and the error vector in an encryption function to produce a ciphertext for the encapsulation round:
   generating a symmetric key based on the random seed value;
   generating an encrypted message based on the symmetric key; and
   providing the ciphertexts for the recipient and the encrypted message for transmission between nodes in a communication system.

2. The method of claim 1, wherein the encryption function comprises a McEliece encryption function, and wherein using the plaintext value and the error vector in the encryption function comprises using the error vector and a public key to encrypt the plaintext value according to a McEliece cryptosystem.

3. The method of claim 1, wherein the error vector has a Hamming weight equal to t, and respective positions of the nonzero elements of the error vector are indicated by the filtered pseudorandom function output.

4. The method of claim 1, wherein generating the symmetric key based on the random seed value comprises applying a pseudorandom function to the random seed value to produce a pseudorandom function output that includes the symmetric key.

5. The method of claim 4, wherein the pseudorandom function output comprises the symmetric key and a confirmation value, and the method comprises providing the confirmation value for transmission to the recipient.

6. The method of claim 1, wherein each encapsulation round generates a respective ciphertext based on the random seed value and the additional value for the encapsulation round, the additional value further comprising an identifier of the recipient.

7. The method of claim 1, wherein:
   the key encapsulation process generates multiple ciphertexts for each of multiple recipients, each recipient identified by a respective identifier;
   the additional value for each encapsulation round comprises an index for the encapsulation round and an identifier for one of the multiple recipients; and
   the method comprises providing the encrypted message and the multiple ciphertexts for each respective recipient for transmission to the respective recipient.

8. A computing system, comprising:
   one or more processors; and
   memory storing instructions that, when executed by the one or more processors, perform operations comprising:
      obtaining a random seed value;
      executing a key encapsulation process to generate multiple ciphertexts for a recipient, the key encapsulation process comprising multiple encapsulation rounds, each encapsulation round generating a respective ciphertext based on the random seed value and an additional value, the additional value comprising an index indicating the encapsulation round;
      wherein each encapsulation round comprises:
         applying an error vector derivation function to a combination of the random seed value and the additional value for the encapsulation round to produce an error vector, wherein applying the error vector derivation function comprises:
            applying a pseudorandom function to the combination of the random seed value and the additional value to produce a pseudorandom function output;
            applying a filter to the pseudorandom function output to produce a filtered pseudorandom function output of t integers; and
            generating the error vector based on the filtered pseudorandom function output;
         generating a plaintext value based on the random seed value and the error vector; and
         using the plaintext value and the error vector in an encryption function to produce a ciphertext for the encapsulation round:
      generating a symmetric key based on the random seed value;
      generating an encrypted message based on the symmetric key; and
      providing the ciphertexts for the recipient and the encrypted message for transmission between nodes in a communication system.

9. The computing system of claim 8, wherein generating the symmetric key based on the random seed value comprises applying a pseudorandom function to the random seed value to produce a pseudorandom function output that includes the symmetric key.

10. The computing system of claim 8, wherein each encapsulation round generates a respective ciphertext based on the random seed value and the additional value for the encapsulation round, the additional value further comprising an identifier of the recipient.

11. The computing system of claim 8, wherein:
the key encapsulation process generates multiple ciphertexts for each of multiple recipients, each recipient identified by a respective identifier;
the additional value for each encapsulation round comprises an index for the encapsulation round and an identifier for one of the multiple recipients; and
the operations comprise providing the multiple ciphertexts for each respective recipient and the encrypted message for transmission to the respective recipient.

12. The computing system of claim 8, wherein the encryption function comprises a McEliece encryption function, and wherein using the plaintext value and the error vector in the encryption function comprises using the error vector and a public key to encrypt the plaintext value according to a McEliece cryptosystem.

13. The computing system of claim 8, wherein the error vector has a Hamming weight equal to t, and respective positions of the nonzero elements of the error vector are indicated by the filtered pseudorandom function output.

14. The computing system of claim 9, wherein the pseudorandom function output comprises the symmetric key and a confirmation value, and the operations comprise providing the confirmation value for transmission to the recipient.

15. A non-transitory computer-readable medium storing instructions that when executed by data processing apparatus perform operations comprising:
obtaining a random seed value;
executing a key encapsulation process to generate multiple ciphertexts for a recipient, the key encapsulation process comprising multiple encapsulation rounds, each encapsulation round generating a respective ciphertext based on the random seed value and an additional value for the encapsulation round, the additional value comprising an index indicating the encapsulation round;
wherein each encapsulation round comprises:
applying an error vector derivation function to a combination of the random seed value and the additional value for the encapsulation round to produce an error vector, wherein applying the error vector derivation function comprises:
applying a pseudorandom function to the combination of the random seed value and the additional value to produce a pseudorandom function output;
applying a filter to the pseudorandom function output to produce a filtered pseudorandom function output of t integers; and generating the error vector based on the filtered pseudorandom function output; generating a plaintext value based on the random seed value and the error vector; and
using the plaintext value and the error vector in an encryption function to produce a ciphertext for the encapsulation round;
generating a symmetric key based on the random seed value;
generating an encrypted message based on the symmetric key; and
providing the ciphertexts for the recipient and the encrypted message for transmission between nodes in a communication system.

16. The non-transitory computer-readable medium of claim 15, wherein the encryption function comprises a McEliece encryption function, and wherein using the plaintext value and the error vector in the encryption function comprises using the error vector and a public key to encrypt the plaintext value according to a McEliece cryptosystem.

17. The non-transitory computer-readable medium of claim 15, wherein the error vector has a Hamming weight equal to t, and respective positions of the nonzero elements of the error vector are indicated by the filtered pseudorandom function output.

18. The non-transitory computer-readable medium of claim 15, wherein generating the symmetric key based on the random seed value comprises applying a pseudorandom function to the random seed value to produce a pseudorandom function output that includes the symmetric key.

19. The non-transitory computer-readable medium of claim 18, wherein the pseudorandom function output comprises the symmetric key and a confirmation value, and the operations comprise providing the confirmation value for transmission to the recipient.

20. The non-transitory computer-readable medium of claim 15, wherein each encapsulation round generates a respective ciphertext based on the random seed value and the additional value for the encapsulation round, the additional value further comprising an identifier of the recipient.

21. The non-transitory computer-readable medium of claim 15, wherein:
the key encapsulation process generates multiple ciphertexts for each of multiple recipients, each recipient identified by a respective identifier;
the additional value for each encapsulation round comprises an index for the encapsulation round and an identifier for one of the multiple recipients; and
the operations comprise providing the encrypted message and the multiple ciphertexts for each respective recipient for transmission to the respective recipient.

* * * * *

UNITED STATES PATENT AND TRADEMARK OFFICE
CERTIFICATE OF CORRECTION

PATENT NO. : 10,404,458 B1
APPLICATION NO. : 16/008944
DATED : September 3, 2019
INVENTOR(S) : Atsushi Yamada and Edward William Eaton It is certified that error appears in the above-identified patent and that said Letters Patent is hereby corrected as shown below:

On the Title Page

Item (71) Column 1, Line 2, delete "Waterlooo" and insert -- Waterloo -- therefor.

Page 2, item (56) Column 2, Line 12, delete "Encyption" and insert -- Encryption -- therefor.

In the Specification

Column 8, Line 57, delete "oft" and insert -- of t -- therefor.

Column 8, Line 59, delete "oft" and insert -- of t -- therefor.

Column 8, Line 66, delete "218" and insert -- 222 -- therefor.

Column 10, Line 13, delete "cont" and insert -- conf' -- therefor.

Column 10, Line 15, delete "conf" and insert -- conf' -- therefor.

Column 10, Line 64, delete "(s'J." and insert -- (s'). -- therefor.

Column 12, Line 45, delete "oft" and insert -- of t -- therefor.

Column 12, Line 47, delete "oft" and insert -- of t -- therefor.

Column 14, Line 9, delete "cont" and insert -- conf' -- therefor.

Column 14, Line 11, delete "conf" and insert -- conf' -- therefor.

Column 15, Line 21, delete "30." and insert -- 360. -- therefor.

Signed and Sealed this
Twenty-second Day of September, 2020

Andrei Iancu
*Director of the United States Patent and Trademark Office*

CERTIFICATE OF CORRECTION (continued)
U.S. Pat. No. 10,404,458 B1

Column 15, Line 30, delete "and" and insert -- or -- therefor.

Column 16, Line 25, delete "in in" and insert -- in -- therefor.

Column 16, Line 26, delete "Cn,m" and insert -- $C_{n,m}$ -- therefor.

Column 17, Line 9, delete "Kin" and insert -- K in -- therefor.

Column 17, Line 17, delete "Kin" and insert -- K in -- therefor.

Column 17, Line 20, delete "in in" and insert -- in -- therefor.

Column 20, Line 8, after "(e.g.," insert -- $e_{i,d}$,' --.

Column 22, Line 28, delete "(Cn,m)" and insert -- ($C_{n,m}$) -- therefor.

In the Claims

Column 27, Line 41, Claim 1, delete "oft" and insert -- of t -- therefor.

Column 27, Line 43, Claim 1, delete "output:" and insert -- output; -- therefor.

Column 27, Line 48, Claim 1, delete "round:" and insert -- round; -- therefor.

Column 28, Line 55, Claim 8, delete "round:" and insert -- round; -- therefor.

Column 30, Line 1, Claim 15, after "and", insert -- ¶ --.

Column 30, Line 2, Claim 15, after "output;", insert -- ¶ --.